United States Patent
Miao et al.

(10) Patent No.: US 11,153,863 B2
(45) Date of Patent: Oct. 19, 2021

(54) PHYSICAL DOWNLINK CONTROL CHANNEL (PDCCH) DEMODULATION REFERENCE SIGNAL (DMRS) TRANSMISSION AND RECEPTION

(71) Applicant: Apple Inc., Cupertino, CA (US)

(72) Inventors: Honglei Miao, Munich BY (DE); Wook Bong Lee, San Jose, CA (US); Yushu Zhang, Beijing (CN); Michael Faerber, Wolfratshausen BY (DE); Seunghee Han, San Jose, CA (US)

(73) Assignee: Apple Inc., Cupertino, CA (US)

( * ) Notice: Subject to any disclaimer, the term of this patent is extended or adjusted under 35 U.S.C. 154(b) by 160 days.

(21) Appl. No.: 16/478,456

(22) PCT Filed: Feb. 14, 2018

(86) PCT No.: PCT/US2018/018109
§ 371 (c)(1),
(2) Date: Jul. 16, 2019

(87) PCT Pub. No.: WO2018/152153
PCT Pub. Date: Aug. 23, 2018

(65) Prior Publication Data
US 2021/0136733 A1 May 6, 2021

Related U.S. Application Data

(60) Provisional application No. 62/460,603, filed on Feb. 17, 2017, provisional application No. 62/561,028, filed on Sep. 20, 2017.

(51) Int. Cl.
*H04W 72/04* (2009.01)
*H04B 7/0452* (2017.01)
(Continued)

(52) U.S. Cl.
CPC ........ *H04W 72/042* (2013.01); *H04B 7/0452* (2013.01); *H04B 7/0689* (2013.01); *H04L 5/0048* (2013.01)

(58) Field of Classification Search
CPC . H04W 72/042; H04B 7/0452; H04B 7/0689; H04L 5/0048
See application file for complete search history.

(56) References Cited

U.S. PATENT DOCUMENTS

| | | | |
|---|---|---|---|
| 2013/0215842 A1* | 8/2013 | Han | H04L 5/0053 370/329 |
| 2013/0235812 A1* | 9/2013 | Heo | H04L 5/0023 370/329 |

(Continued)

FOREIGN PATENT DOCUMENTS

| | | |
|---|---|---|
| EP | 2793518 A1 | 10/2014 |
| WO | 203/153276 A1 | 10/2013 |

OTHER PUBLICATIONS

International Patent Office—International Search Report and Written Opinion dated Jul. 13, 2018, from International Patent Application No. PCT/US2018/018109, 24 pages.

(Continued)

*Primary Examiner* — Chi Ho A Lee
(74) *Attorney, Agent, or Firm* — Sterne, Kessler, Goldstein & Fox P.L.L.C.

(57) ABSTRACT

Embodiments of the present disclosure describe methods and apparatuses for physical downlink control channel (PDCCH) demodulation reference signal (DMRS) transmission and reception.

23 Claims, 15 Drawing Sheets

(51) Int. Cl.
    *H04B 7/06*     (2006.01)
    *H04L 5/00*     (2006.01)

(56) References Cited

U.S. PATENT DOCUMENTS

| | | | | |
|---|---|---|---|---|
| 2014/0233407 | A1* | 8/2014 | Pourahmadi | H04L 5/0094 |
| | | | | 370/252 |
| 2014/0328302 | A1* | 11/2014 | Park | H04W 72/08 |
| | | | | 370/329 |
| 2015/0055581 | A1* | 2/2015 | Janis | H04L 1/0643 |
| | | | | 370/329 |
| 2015/0146670 | A1* | 5/2015 | Liu | H04L 5/0048 |
| | | | | 370/329 |
| 2015/0282192 | A1* | 10/2015 | Shin | H04J 11/0023 |
| | | | | 370/329 |
| 2018/0145809 | A1* | 5/2018 | Kwak | H04L 5/0051 |
| 2018/0167920 | A1* | 6/2018 | Kim | H04L 5/0048 |
| 2018/0227156 | A1* | 8/2018 | Papasakellariou | |
| | | | | H04W 72/0453 |
| 2019/0342865 | A1* | 11/2019 | Shin | H04L 5/0083 |

OTHER PUBLICATIONS

Intel, "DMRS design for NR PDCCH," 3GPP TSG RAN WG1 #88, R1-1702221, Agenda item: 8.1.3.1.3, Feb. 13-17, 2017, Athens, Greece, 4 pages.

* cited by examiner

PHYSICAL DOWNLINK CONTROL CHANNEL (PDCCH) DEMODULATION REFERENCE SIGNAL (DMRS) TRANSMISSION AND RECEPTION

CROSS REFERENCE TO RELATED APPLICATIONS

This application is a national phase entry under 35 U.S.C. § 371 of International Application No. PCT/US2018/018109, filed Feb. 14, 2018, entitled "PHYSICAL DOWNLINK CONTROL CHANNEL (PDCCH) DEMODULATION REFERENCE SIGNAL (DMRS) TRANSMISSION AND RECEPTION," which claims priority under 35 U.S.C. § 119(e) to U.S. Provisional Patent Application No. 62/460,603 entitled "TRANSMIT DIVERSITY FOR FIFTH GENERATION (5G) NEW RADIO PHYSICAL CONTROL CHANNEL," filed Feb. 17, 2017 and U.S. Provisional Patent Application No. 62/561,028 entitled "ENHANCED MU-MIMO NR-PDCCH RECEPTION TRANSMIT DIVERSITY FOR FIFTH GENERATION (5G) NEW RADIO PHYSICAL CONTROL CHANNEL," filed Sep. 20, 2017, the entire disclosures of which are hereby incorporated by reference.

FIELD

Embodiments of the present disclosure generally relate to the field of networks, and more particularly, to apparatuses, systems, and methods for physical downlink control channel (PDCCH) demodulation reference signal (DMRS) transmission and reception.

BACKGROUND

In a cellular communication system, a base station may enable a device, such as, for example, a user equipment (UE), to access a cellular network supported by the base station. Downlink communication may refer to a communication link from the base station to the UE, and uplink communication may refer to a communication link from the UE to the base station. A UE and a base station may transmit data at their physical layers of, for example, the Open System Interconnection (which may be known as OSI) or Transmission Control Protocol/Internet Protocol (which may be known as TCP/IP) network protocol stack. A channel defined for the physical layer in the downlink may include a physical downlink control channel (PDCCH).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2A illustrates a REG cluster that includes two consecutive REGs in time; and FIG. 2B illustrates a REG cluster that includes two consecutive REGs in frequency.

DETAILED DESCRIPTION

Figure 1:
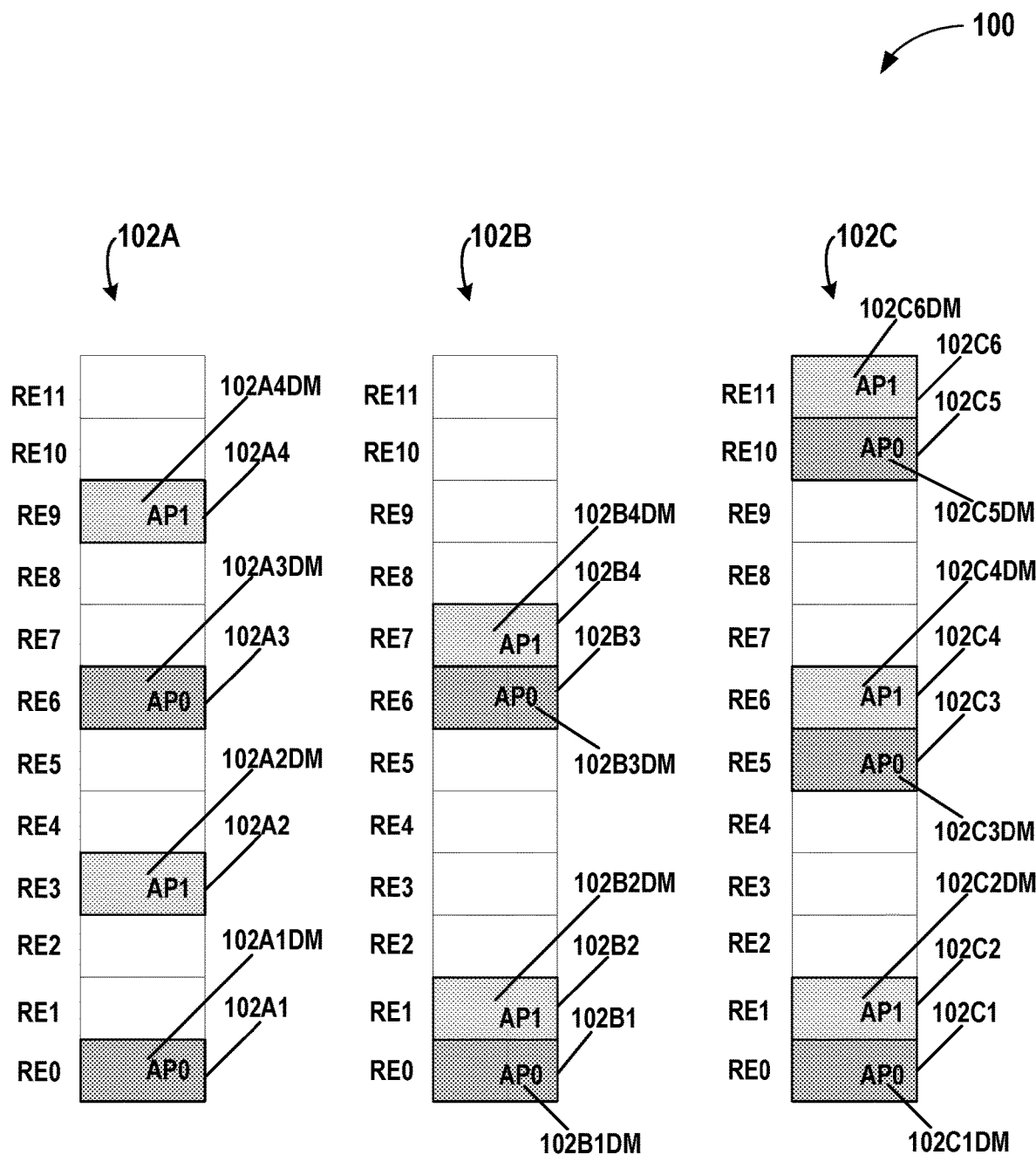
FIG. 1 illustrates an example per-resource element group (REG) DMRS placement according to some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed embodiments. However, it will be apparent to those skilled in the art having the benefit of the present disclosure that the various aspects of the embodiments claimed may be practiced in other examples that depart from these specific details. In certain instances, descriptions of well-known devices, circuits, and methods are omitted so as not to obscure the description of embodiments of the present disclosure with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A or B" means (A), (B), or (A and B).

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional operations not included in the figure(s). A process may correspond to a method, a function, a procedure, a subroutine, a subprogram, and the like. When a process corresponds to a function, its termination may correspond to a return of the function to the calling function and/or the main function.

As used herein, the term "processor circuitry" refers to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. As used herein, the term "interface circuitry" refers to, is part of, or includes circuitry providing for the exchange of information between two or more components or devices. The term "interface circuitry" may refer to one or more hardware interfaces (for example, buses, input/output (I/O) interfaces, peripheral component interfaces, and the like).

As used herein, the term "user equipment" or "UE" may be considered synonymous to, and may hereafter be occasionally referred to, as a client, mobile, mobile device, mobile terminal, user terminal, mobile unit, mobile station, mobile user, subscriber, user, remote station, access agent, user agent, receiver, etc., and may describe a remote user of network resources in a communications network. Furthermore, the term "user equipment" or "UE" may include any type of wireless/wired device such as consumer electronics devices, cellular phones, smartphones, tablet personal computers, Internet of Things ("IoT") devices, smart sensors, wearable computing devices, personal digital assistants (PDAs), desktop computers, and laptop computers, for example.

As used herein, the term "base station" may be considered synonymous to, and may hereafter be occasionally referred to, as access nodes (ANs), NodeBs, evolved NodeBs (eNBs), next Generation NodeBs (gNB), radio access node (RAN) nodes, and so forth, and may comprise ground stations (e.g., terrestrial access points) or satellite stations providing coverage within a geographic area (e.g., a cell). A base station may be a device that is consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a $3^{rd}$ Generation Partnership Project ("3GPP") Long Term Evolution (LTE) protocol, a fifth generation (5G) protocol, which may be referred to as New Radio (NR), or a protocol that is consistent with other existing generations, generations in development or to be developed in the future (e.g., second generation (2G), sixth generation (6G), etc.), an NR protocol, and the like.

In cellular communication protocols, such as, for example, the LTE protocol, a 5G protocol, or other protocol, the PDCCH may carry data to perform, among other things, downlink data scheduling and uplink data assignment. A PDCCH may include various resource levels. For example, a PDCCH may include a resource element (RE); a REG that includes a group of REs; and an RB that may include a large number of REs and that may be a resource allocated to transmit data to a UE. Further, a control channel element (CCE) may include group of REGs, and an aggregation level (AL) may include a group of CCEs. For example, an AL may include a group of 1, 2, 4, or 8 CCEs.

A UE may be configured with one or more control channel search spaces (SS), in which a number of PDCCH blind decoding (BD) candidates may be defined. Data in a PDCCH may be coded, and the coded bits may be pre-coded and then modulated for conversion to modulated symbols that may be interleaved and mapped to REs for transmission. Upon reception of a PDCCH, a UE may perform deinterleaving, deprecoding, symbol combining, and symbol demodulation. The UE may then perform BD of the PDCCH data, given that the UE may not be aware of the number of CCEs to which a control channel may be mapped. The UE may monitor a set of PDCCH BD candidates, which may be, for example a set of consecutive CCEs on which a PDCCH may be mapped, and may attempt to decode the candidates. If no error is detected during decoding, the UE may determine that the PDCCH carries the UE's control information.

To support link adaptation, several ALs of CCEs targeting different link quality or coverage may be employed for a control channel. For example, an LTE PDCCH may support AL 1, 2, 4 and 8, and a PDCCH at AL X may include X CCEs. Link adaptation may refer to the ability to adapt a modulation scheme, error correction, or other signal and protocol parameters to the conditions of a radio link (e.g., path loss, interference caused by signals from other transmitters, sensitivity of a receiver, etc.) For example, if radio link conditions are good, an efficient modulation scheme and a small amount of error correction may be used, and data throughput may be high. Conversely, given that link adaptation may be a dynamic process, if, for example, radio link conditions become poor, a more robust modulation scheme and increased error correction may be used, and data throughput may drop.

A control channel SS may include multiple BD candidates at each supported AL. For example, in LTE, a UE-specific SS may include six AL1 BD candidates, six AL2 BD candidates, two AL4 BD candidates, and two AL8 BD candidates. The number of BD candidates may be chosen to achieve an acceptable trade-off between desired control channel blocking probability and UE BD computation complexity. The UE in the cell may monitor the configured SS's in every transmit time interval (TTI) by performing BD attempts.

Once a transmitted PDCCH is correctly decoded by a UE, the UE may further demodulate the scheduled downlink data channel or transmit the assigned uplink data. These functions of LTE PDCCH may be adopted in PDCCHs for other protocols, such as, for example, a 5G NR PDCCH (NR-PDCCH). However, due to the minimization of "always-on" signal, i.e., absence of a cell-specific reference signal (CRS) in NR, unlike LTE PDCCH, which may use a CRS for channel estimation and coherence demodulation, the NR-PDCCH may employ a UE-specific DMRS.

In order to achieve reliable reception performance, in addition to frequency diversity obtained from distributed transmission, transmit diversity (which may also be referred to as TxD) techniques may be supported, for example, for an LTE PDCCH and enhanced PDCCH (EPDCCH). Transmit diversity may refer to radio communication using signals that originate from two or more independent sources, such as, for example, two or more transmit antennas. A transmit antenna may be a physical antenna at a transmitter, such as, for example, a base station. A transmit antenna may also be referred to as a transmit antenna port. Depending on the context, an antenna port (which may also be referred to as an AP) may refer to a transmit antenna.

Transmit diversity may diminish the effects of signal attenuation caused by, for example, fading, and thus improve signal reception, by transmitting portions of the same information from two different transmit antennas. The data from one transmit antenna may be encoded in a way that distinguishes it from data from another transmit antenna. If data from one transmit antenna is encoded in a way that distinguishes it from data from another transmit antenna, a UE may be able to recognize that the data is coming from more than one antenna and properly decode the data. For example, space frequency block coding (SFBC) and per-RE precoder cycling have been adopted as TxD schemes of diversity order two for PDCCH and EPDCCH. Per-RE precoder cycling may refer to different REs being transmitted from different pre-coded transmit antennas. A precoder may be, for example, a precoding vector. Multiple transmit antennas may be referred to as a transmit antenna array. A transmit antenna array multiplied by a precoding vector may be referred to as a pre-coded transmit antenna array. An RE multiplied by a precoding vector may result in a vector that may be referred to as a pre-coded RE. Each entry of a pre-coded RE may be transmitted by a different pre-coded transmit antenna. A pre-coded transmit antenna, which may also be referred to as a pre-coded antenna, may be one of multiple transmit antennas from which a signal may be transmitted such that the signal power or throughput may be maximized at multiple receive antennas. A pre-coded RE may be transmitted by a pre-coded transmit antenna array, which may also be referred to as a virtual antenna port. Similarly, a pre-coded transmit antenna may be a transmit antenna array from which an RE multiplied by a precoder, which results in a vector, may be transmitted. Depending on the context, an antenna port may refer to a pre-coded transmit antenna.

SFBC in combination with frequency switched transmit diversity (FSTD) may be standardized as the TxD technique with four transmit antenna ports for, for example, an LTE PDCCH. An antenna port (which may also be referred to as a transmit antenna port) may be a logical entity that may be distinguished relative to different reference signals. A reference signal (RS) may be a signal that provides a reference point for a UE to determine, for example, downlink power, which may be, for example, the power of the signal received from a base station, or to demodulate a received signal. An RS may include data known to the base station and the UE, and thus the UE may compare a received RS to a known RS and use the result of the comparison to determine the information of interest, as determined, for example, by the type of RS. Multiple antenna port signals may be transmitted on a single transmit antenna, or a single antenna port signal may be spread across multiple transmit antennas. A transmit antenna may be an antenna port. A transmit antenna may also be a pre-coded transmit antenna. A pre-coded antenna array may be a virtual antenna port.

For reliable reception performance, an NR-PDCCH may support TxD with at least up to two transmit antennas. Moreover, SFBC and per-RE precoder cycling may be two candidate TxD schemes. Due to the DMRS overhead in a NR-PDCCH resource element group (NR-REG), it may be challenging to support TxD with four transmit antennas for a NR-REG. Overhead may refer to, for example, occupying a RE that may otherwise be available for other data, which may reduce the number of REs available for other data. A NR-PDCCH may be capable of supporting TxD with similar diversity order as LTE PDCCH, e.g., TxD order four obtained from four transmit antennas.

While transmit diversity may include transmission of, for example, a single UE's PDCCH DMRSs from multiple transmit antennas, multi-user multiple-input multiple-output (MU-MIMO) transmission may include transmission of, for example, multiple UEs' PDCCH DMRSs from multiple transmit antennas. In MU-MIMO transmission, a multi-antenna transmitter, such as, for example, a base station, may communicate with multiple receivers, such as, for example, UEs, each of which may have one or more antennas. Further, to increase control channel capacity or spectrum efficiency, MU-MIMO transmission may be supported by NR-PDCCH.

A signal may be transmitted through a medium, which may be referred to as a channel. The signal may, for example, be distorted or have noise added, as the signal goes through the channel. To properly decode a received signal, any distortion or noise applied by the channel may be removed from the received signal. In order to do this, a UE may determine the characteristics of the channel through which the signal was transmitted. The process of determining the characteristics of a channel may be referred to as channel estimation. A DMRS may be used for channel estimation for a PDCCH, to, for example, estimate the channel for demodulation.

The following are examples of two ways MU-MIMO PDCCH transmission may be used. One way may be based on non-orthogonal DMRS in a specification transparent manner, where two MU-MIMO PDCCHs may utilize quasi-orthogonal DMRS with UE-specific beamforming. Beamforming may be a signal processing technique used for directional signal transmission or reception. The other way MU-MIMO transmission may be used may be based on orthogonal DMRS transmission for two MU-MIMO PDCCHs. With orthogonal transmission, multiple narrow band signals may be transmitted on orthogonal subcarriers at lower data rates. Cross-talk between the subcarriers may be reduced or eliminated, as interference or inter-channel interference (ICI) may be cancelled as, for example, subcarriers may be located such that when one subcarrier is at a peak, an adjacent subcarrier may be null and thus cancel out each other. With non-orthogonal transmission, higher data rates may be achieved, but at the cost of higher ICI. Non-orthogonal DMRS-based MU-MIMO PDCCH transmission may be supported by various protocols. Orthogonal DMRS based MU-MIMO PDCCH transmission may be supported by various protocols, such as, for example, NR.

By virtue of UE channel state information (CSI) feedback, next Generation NodeBs (gNB) may apply UE-specific precoding/beamforming vectors for two co-scheduled MU-MIMO PDCCHs to minimize the mutual-UE co-channel interference at each UE. However, due to the imperfection of CSI feedback/tracking, there may be some residual co-channel interference in the received MU-MIMO PDCCH at a UE. This may occur, for example, for both non-orthogonal DMRS-based and orthogonal DMRS-based MU- MIMO PDCCH transmission schemes. Interference suppression may improve the receive performance of a MU-MIMO PDCCH.

Embodiments herein may include TxD schemes with high diversity order, e.g., four, for NR-PDCCH. Although embodiments herein may refer to a TxD order of four, embodiments herein may be used to achieve any level of diversity order. Embodiments of TxD schemes herein may enable NR-PDCCH to achieve TxD order of more than two, which may significantly enhance the NR-PDCCH coverage and spectrum efficiency.

Embodiments may include two classes of TxD schemes that may be used to achieve higher diversity order, e.g., four. Both classes of TxD may be extended TxD schemes with regard to SFBC and per-RE precoder cycling of two transmit antennas. Class 1 may be referred to as extended SFBC-based transmit diversity. Class 2 may be referred to as per-RE precoder cycling-based transmit diversity. In each class, on top of a basic TxD scheme, i.e., two-transmit-antenna-based SFBC or per-RE precoder cycling, antenna or precoder pair cycling may be further applied to achieve higher TxD order. In addition, antenna or precoder cycling may be applied in different resource levels, for example, REG, cluster of REGs, or RB. A cluster of REGs may be referred to as a REG cluster, which may be referred to as a REG bundle. Embodiments herein may include several DMRS placement options, such as, for example, per-REG, per-REG-cluster and per-RB. Table 1 summarizes embodiments described herein.

TABLE 1

Summary of Transmit Diversity Schemes

| | | |
|---|---|---|
| Class 1 | Embodiment 1: | SFBC with per-REG transmit antenna pair cycling |
| | Embodiment 2: | SFBC with per-REG-cluster transmit antenna pair cycling |
| | Embodiment 3: | SFBC with per-RB transmit antenna pair cycling |
| Class 2 | Embodiment 4: | Per-RE precoder cycling with per-REG pre-coded antenna pair cycling |
| | Embodiment 5: | Per-RE precoder cycling with per-REG-cluster pre-coded antenna pair cycling |
| | Embodiment 6: | Per-RE precoder cycling with per-RB pre-coded antenna pair cycling |

FIG. 1 illustrates an example per-REG DMRS placement according to some embodiments. With a per-REG DMRS placement, DMRSs may be embedded in every REG of a NR-PDCCH BD candidate. As shown in FIG. 1, different DMRS patterns with different placements and RS overhead may be considered. FIG. 1, as well as FIG. 2 and FIG. 3 that follow, may illustrate DMRS patterns for DMRS placement in REs at different resource levels, without illustrating data REs that may be BD candidates, as may be illustrated in FIGS. 4, 5, and 6. For purposes of illustration and ease of explanation, embodiments herein may be described with regard to a DMRS. However, embodiments herein are not limited to a DMRS and may be used with other types of RSs. Further, for purposes of illustration and ease of explanation, embodiments herein may be described with regard to a PDCCH. However, embodiments herein are not limited to a PDCCH and may be used with other types of physical control channels, such as, for example, a physical broadcast control channel (PBCH), a physical shared control channel (PSCCH), etc. Further, for purposes of illustration and ease of explanation, embodiments herein may be described with regard to the patterns illustrated in FIG. 1. However, embodiments herein are not limited to the patterns illustrated in FIG. 1.

A NR-PDCCH at a certain AL may include a number of REGs. For example, NR-PDCCH 100 may include, for example, REG 102A, REG 102B, and REG 102C. Although embodiments herein may be described in terms of NR, embodiments herein may be used with any other existing cellular communication protocol, those in development, or those to be developed in the future. A REG may include, for example, 12 REs, such as, for example, RE0 through RE11. For purposes of illustration and ease of explanation, embodiments herein may include three REGs. However, embodiments herein may include any number of REGs. For purposes of illustration and ease of explanation, embodiments herein may include 12 REs in an REG. However, embodiments herein may include any number of REs in an REG.

In an REG, an even number of REs, such as, for example, RE 102A1, RE 102A2, RE 102A3, RE 102A4, RE 102B1, RE 102B2, RE 102B3, RE 102B4, RE 102C1, RE 102C2, RE 102C3, RE 102C4, RE 102C5, and RE 102C6, may be allocated for DMRSs, such as, for example, DMRS 102A1DM, 102A2DM, 102A3DM, 102A4DM, 102B1DM, 102B2DM, 102B3DM, 102B4DM, 102C1DM, 102C2DM, 102C3DM, 102C4DM, 102C5DM, and 102C6DM. In an embodiment, the DMRSs may be allocated to support, for example, the channel estimation of two transmit antenna ports, such as, for example, AP0 and AP1. In another embodiment, the DMRSs may be allocated to support, for example, the channel estimation of two pre-coded transmit antenna ports, such as, for example, AP0 and AP1. An AP may also be referred to as a transmit antenna or an antenna. Although embodiment herein may be described with regard to either a transmit antenna port or a pre-coded transmit antenna port, embodiments described with regard to a transmit antenna port may be used with a pre-coded transmit antenna port, and embodiments described with regard to a pre-coded transmit antenna port may be used with a transmit antenna port. In an embodiment, a DMRS may be embedded in each REG. In an embodiment, the SFBC of two transmit antennas, for example, AP0 and AP1, may be applied to each REG. In another embodiment, the per-RE precoder cycling of two pre-coded transmit antennas, for example, AP0 and AP1, may be applied to each REG.

Figure 2A:
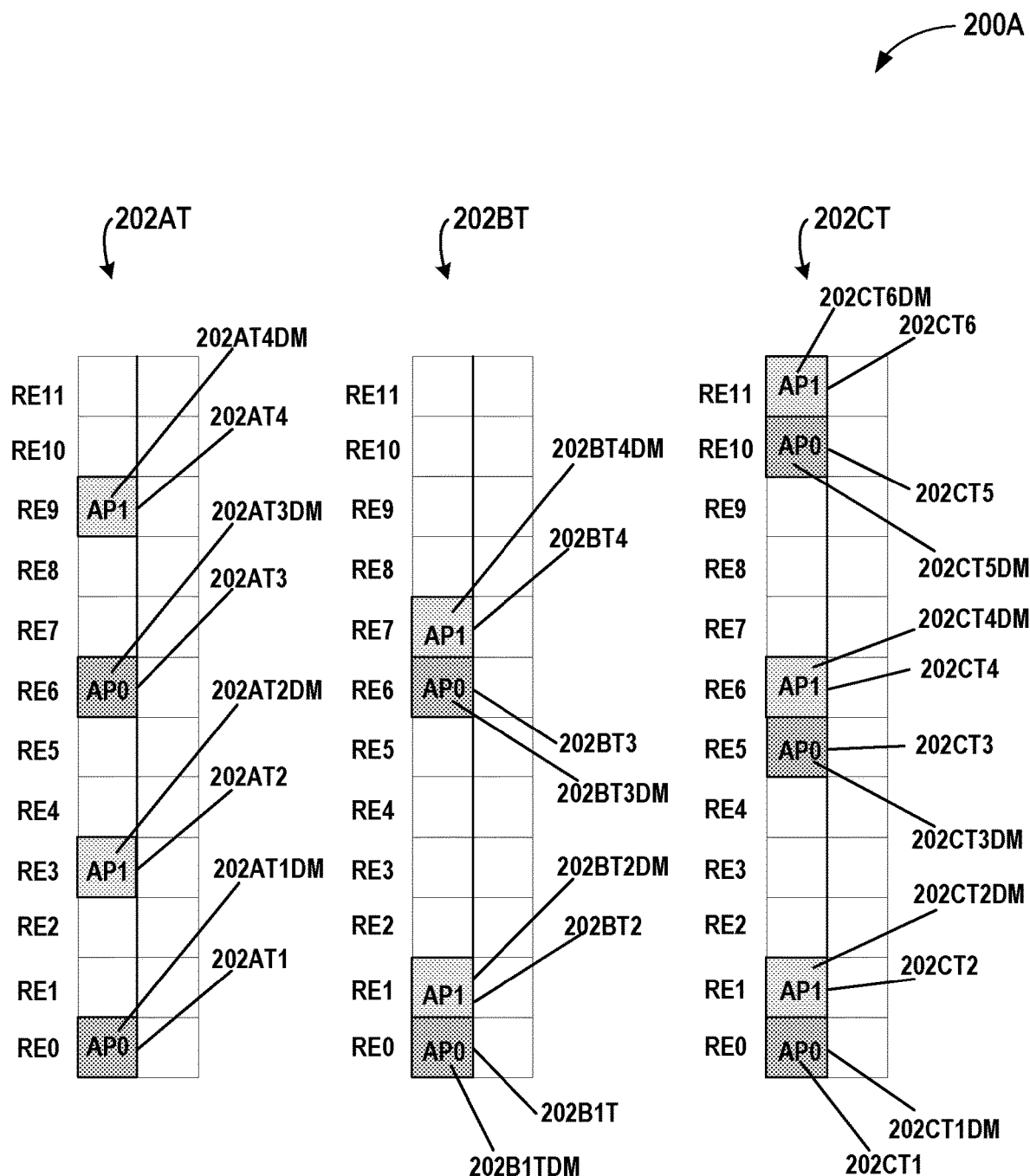
FIGS. 2A and 2B illustrate example per-REG-cluster DMRS placement according to some embodiments where.
Figure 2B:
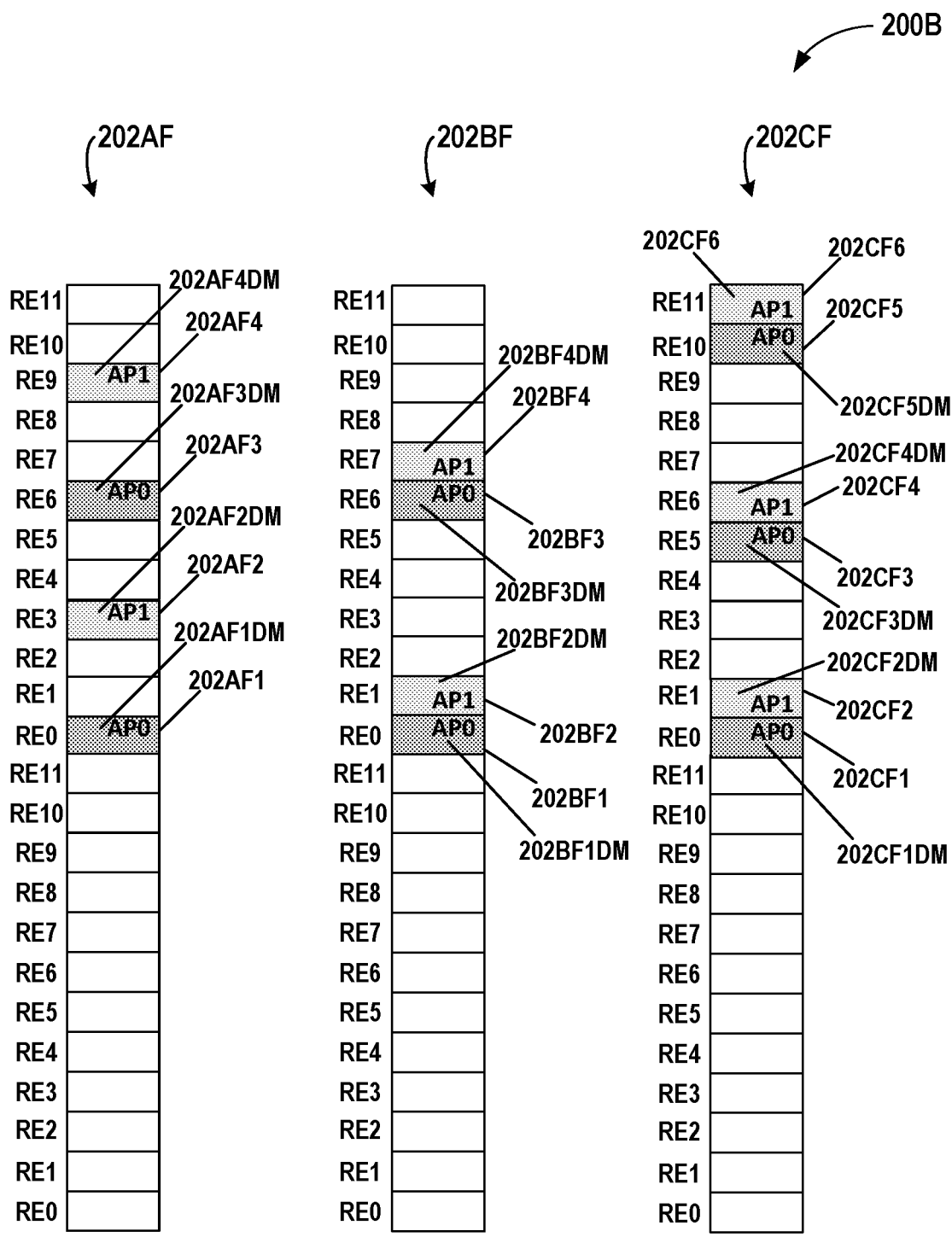

FIGS. 2A and 2B illustrate example per-REG-cluster DMRS placement according to some embodiments. With per-REG-cluster DMRS placement, the DMRS may be defined in a REG cluster, which may include, for example, several consecutive REGs in time or frequency. As shown in FIG. 2, in some embodiments, the DMRS patterns in FIG. 1 may be used for the DMRS in FIG. 2. For purposes of illustration and ease of explanation, the DMRS patterns in FIG. 1 are used in FIG. 2. However, embodiments herein are not limited to the DMRS patterns shown in FIG. 1. As shown in FIGS. 2A and 2B, a cluster of REGs may include two consecutive REGs in time and frequency, respectively, where the first REG in the cluster may include DMRSs, while the second REG may include REs that may be, for example, mapped for a control data symbol, for example, mapping the control data symbol of a BD candidate.

A NR-PDCCH at a certain AL may include a number of clusters of REGs. For example, NR-PDCCH 200A or NR-PDCCH 200B may include for example, a cluster of two consecutive REGs, such as, for example, REG clusters 202AT, 202BT, and 202CT in the time domain, in the case of NR-PDCCH 200A, or, for example, REG clusters 202AF, 202BF, and 202CF in the frequency domain, in the case of NR-PDCCH 200B.

In a REG cluster, an even number of REs, such as, for example, RE 202AT1, RE102AT2, RE 202AT3, RE202AT4, RE 202BT1, RE102BT2, RE 202BT3, RE202BT4. RE202CT1, RE202CT2, RE202CT3, RE202CT4, RE202CT5, and RE 202CT6, may be allocated for DMRSs, such as, for example, DMRS 202AT1DM, 202AT2DM, 202AT3DM, 202AT4DM, 202BT1DM, 202BT2DM, 202BT3DM, 202BT4DM, 202CT1DM, 202CT2DM, 202CT3DM, 202CT4DM, 202CT5DM, and 202CT6DM in the time domain in the case of NR-PDCCH 200A, or, for example, RE 202AF1, RE102AF2, RE 202AF3, RE202AF4, RE 202BF1, RE102BF2, RE 202BF3, RE202BF4. RE202CF1, RE202CF2, RE202CF3, RE202CF4, RE202CF5, and RE 202CF6, may be allocated for DMRSs, such as, for example, DMRS 202AF1DM, 202AF2DM, 202AF3DM, 202AF4DM, 202BF1DM, 202BF2DM, 202BF3DM, 202BF4DM, 202CF1DM, 202CF2DM, 202CF3DM, 202CF4DM, 202CF5DM, and 202CF6DM, in the frequency domain in the case of NR-PDCCH 200B. In an embodiment, the DMRSs may be allocated to support, for example, the channel estimation of two transmit antenna ports, such as, for example, AP0 and AP1. In another embodiment, the DMRSs may be allocated to support, for example, the channel estimation of two pre-coded transmit antenna ports, such as, for example, AP0 and AP1. In an embodiment, a DMRS shared by REGs in the same REG cluster may reduce the DMRS overhead. For example, not all REGs in a REG-cluster may include a DMRS, e.g., the second REG in the REG cluster in FIG. 6 does not include a DMRS, and thus DMRS overhead may be reduced as compared to a situation in which each REG in a REG cluster includes a DMRS. In an embodiment, the SFBC of two transmit antennas, for example, AP0 and AP1, may be applied to each REG clusters. In another embodiment, the per-RE precoder of two pre-coded transmit antennas may be applied to each REG cluster.

Figure 3:
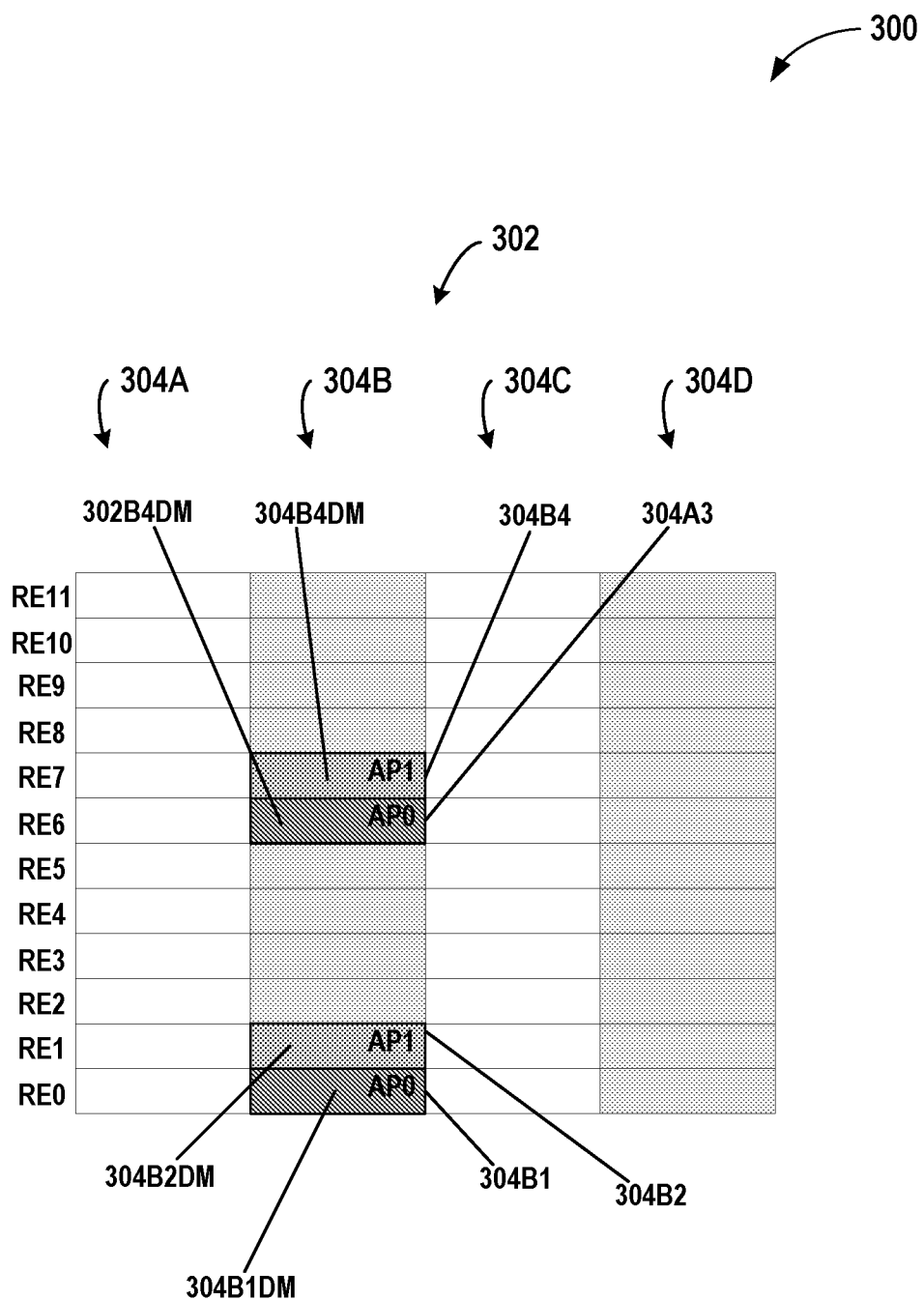
FIG. 3 illustrates an example per-resource block (RB) DMRS placement according to some embodiments.

FIG. 3 illustrates an example per-RB DMRS placement according to some embodiments. With a per-RB DMRS placement, all the REGs in the same RB associated with a NR-PDCCH share the same DMRS. For example, as illustrated in FIG. 3, in a control RB that includes, for example, four REGs, the two shadowed REGs may be associated with a NR-PDCCH BD candidate, and the DMRSs appear in the first REG of the BD candidate in the RB, while the second REG may be used, for example, for a control data symbol, e.g., the second REG in FIG. 3 may use the channel estimates obtained from the DMRS in the first REG for the demodulation of REs in the second REG. For purposes of illustration and ease of explanation, one of the DMRS patterns in FIG. 1 is used in FIG. 3. However, embodiments herein may use any of the DMRS patterns in FIG. 1, as well as any other DMRS patterns. Accordingly, embodiments herein are not limited to the DMRS patterns shown in FIG. 1.

A NR-PDCCH at a certain AL may include a number of REGs, such as, for example, REG 304A, REG 304B, REG 304C, and REG 304D, that may be allocated in one or multiple RBs, such as, for example, RB 302. For REGs, for example, REG 304B and REG 304D, in the same RB, for example, RB 302, an even number of REs, such as, for example, RE 304B1, RE 304B2, REG 304B3, and REG 304B4 may be allocated for DMRSs, such as, for example, such as, for example, DMRS 302B1DM, 302B2DM, 302B3DM, and 302B4DM, embedded in all or some of these REGs to support the channel estimation of two transmit antenna ports, such as, for example, AP0 and AP1. In an embodiment, DMRSs shared by REGs in the same RB may reduce the DMRS overhead. For example, not all REGs in an RB may include a DMRS, e.g., the second REG in the RB in FIG. 7 does not include a DMRS, and thus DMRS overhead may be reduced as compared to a situation in which each REG in an RB includes a DMRS. In an embodiment, the SFBC of two transmit antennas may be applied to all REGs in the same RB. In another embodiment, the per-RE precoder of two pre-coded transmit antennas may be applied to all REGs in the same RB. Based on the above three DMRS placement pattern options, i.e., per-REG, per-REG-cluster and per-RB, transmit antenna pair or pre-coded antenna pair cycling may be used for a NR-PDCCH BD candidate, to achieve higher order transmit diversity.

Figure 4:
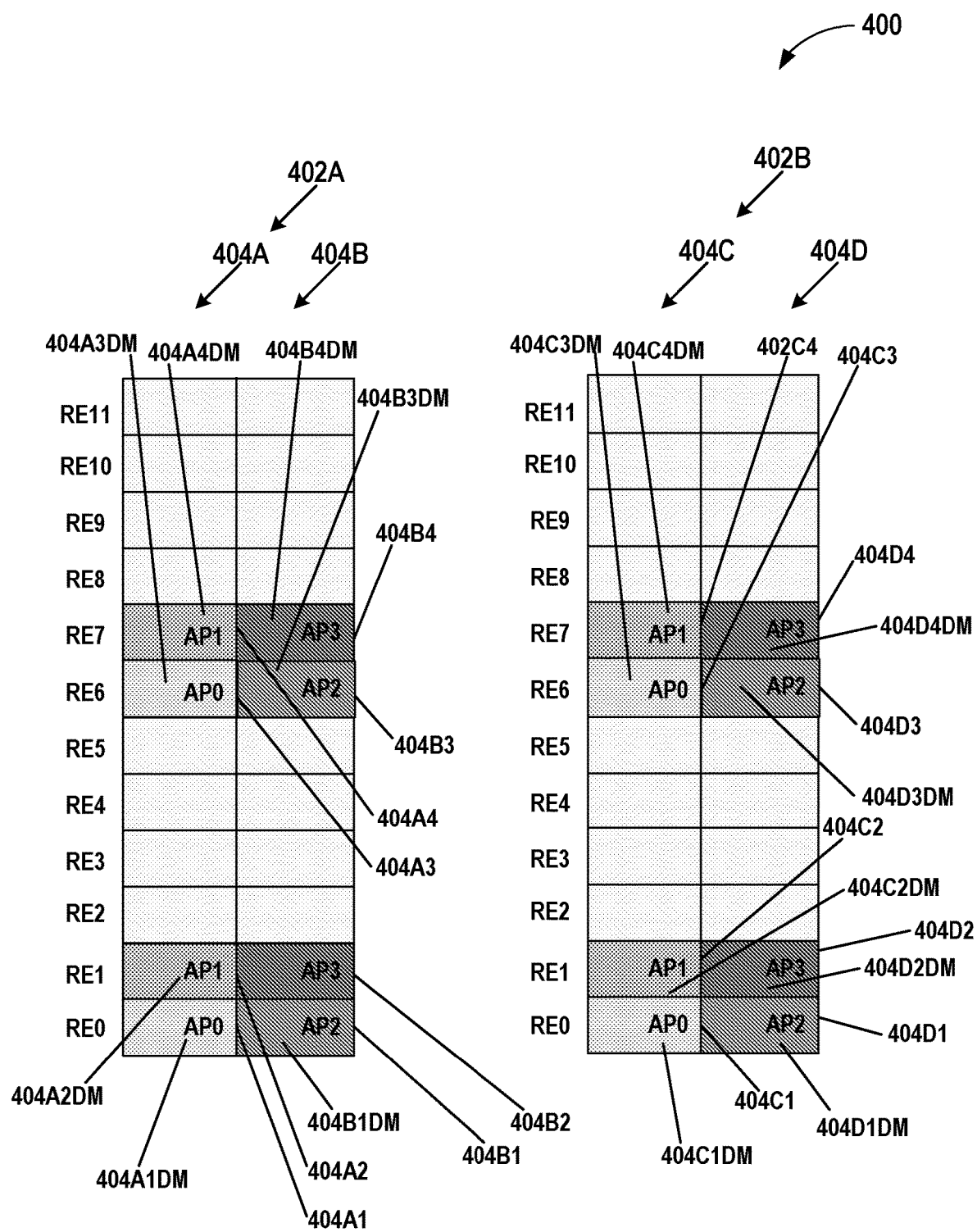
FIG. 4 illustrates an example per-REG DMRS placement for per-REG transmit antenna pair cycling/pre-coded antenna pair cycling according to some embodiments.

FIG. 4 illustrates an example per-REG DMRS placement for per-REG transmit antenna pair cycling/pre-coded antenna pair cycling according to some embodiments. In FIG. 4, NR-PDCCH 400 may include four REGs, e.g., an AL1 candidate, allocated in two RBs, such as, for example, REG 404A and REG 404B allocated in RB 402A, and REG 404C and REG 404D allocated in RB 402B. Each REG of NR-PDCCH 400 may include DMRSs, such as, for example, DMRS 404A1, DMRS 404A2, DMRS 404A3, DMRS 404A4, DMRS 404B1, DMRS 404B2, DMRS 404B3, and DMRS 404B4, DMRS 404C1, DMRS 404C2, DMRS 404C3, DMRS 404C4, DMRS 404D1, DMRS 404D2, DMRS 404D3, and DMRS 404D4. For purposes of illustration and ease of explanation, embodiments herein may be described with regard to four REGs. However, embodiments herein may be used with any number of REGs. Accordingly, embodiments herein are not limited to a particular number of REGs. In an embodiment, DMRSs may be associated with AP pairs, such as, for example, the two AP pairs (AP0, AP1) and (AP2, AP3) alternatively used for the four REGs. In another embodiment, DMRSs may be associated with pre-coded AP pairs, such as, for example, the two pre-coded AP pairs (AP0, AP1) and (AP2, AP3) alternatively used for the four REGs. For purposes of illustration and ease of explanation, embodiments herein may be described with regard to two AP pairs or two pre-coded AP pairs. However, embodiments herein may be used with any number of AP pairs or pre-coded AP pairs. Accordingly, embodiments herein are not limited to a particular number of AP pairs or pre-coded AP pairs.

From the per-REG DMRS placement in FIG. 4, in an embodiment, different groups of REGs may be transmitted from different antenna pairs. In another embodiment, different groups of REGs may be transmitted from different pre-coded antenna pairs. For example, REGs in an NR-PDCCH may be numbered sequentially, and REGs with an even index number may be transmitted from APs 0 and 1 or pre-coded antenna ports 0 and 1, while REGs with an odd index number may be transmitted from antenna ports 2 and 3 or from pre-coded antenna ports 2 and 3.

In an embodiment, a quasi-colocation (QCL) property may be defined and signaled to the UE as part of SS configuration, which may, for example, enhance large scale channel parameter estimation. For example, a network controlled periodically or semi-periodically transmitted RS, such as, for example, a CSI-RS or mobility RS (MRS) may be transmitted from antenna ports 0, 1, 2 and 3. In an embodiment, the CSI-RS or MRS may be configured to be QCL RS for a group of REGs, such as, for example, REGs 404A and REG 404B.

Figure 5:
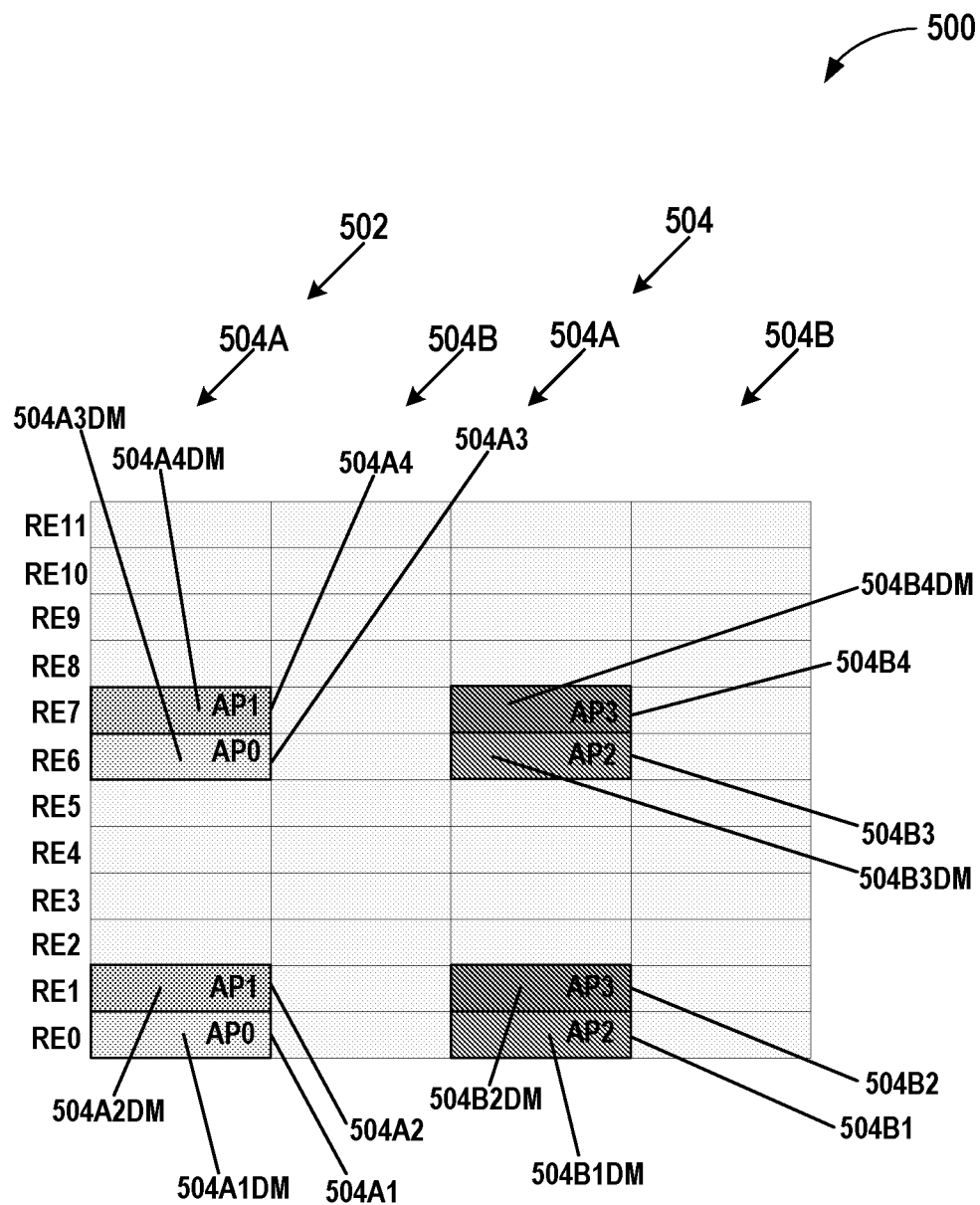
FIG. 5 illustrates an example per-REG-cluster DMRS placement for per-REG-cluster transmit antenna pair cycling/pre-coded antenna pair cycling according to some embodiments.

FIG. 5 illustrates an example per-REG-cluster DMRS placement for per-REG-cluster transmit antenna pair cycling/pre-coded antenna pair cycling according to some embodiments. In FIG. 5, NR-PDCCH 500 may include an RB, such as, for example, RB 501, that includes two REG clusters, such as, for example, REG cluster 502 that includes REG 504A and REG 504B, and REG cluster 502B that includes REG 504A and REG 504B. In an embodiment, a DMRS may be allocated in one REG of a REG cluster, such as, for example, DMRS 504A1DM, DMRS 504A2DM, DMRS 502A3DM, and DMRS 504A4DM allocated to REG 502A, and DMRS 504B1, DMRS 502B2, DMRS 502B3, and DMRS 502B4 allocated to REG 502B. In an embodiment, REs in a first cluster may be transmitted from a first of two antenna port pairs, such as, for example, the antenna port pair (AP0, AP1), and the REs in a second cluster may be transmitted from a second of the two antenna port pairs, such as, for example, the antenna port pair (AP2, AP3). In another embodiment, REs in a first cluster may be transmitted from a first of two pre-coded antenna port pairs, such as, for example, the pre-coded antenna port pair (AP0, AP1), and the REs in a second cluster may be transmitted from a second of the two pre-coded antenna port pairs, such as, for example the pre-coded antenna port pair (AP2, AP3).

From the per-REG DMRS placement in FIG. 5, in an embodiment, different groups of REG clusters may be transmitted from different antenna pairs. In another embodiment, different groups of REG clusters may be transmitted from different pre-coded antenna pairs. For example, REG clusters in an NR-PDCCH may be numbered sequentially, and REG clusters with an even index number may be transmitted from antenna ports 0 and 1 or pre-coded antenna ports 0 and 1, while REG clusters with an odd index number may be transmitted from antenna ports 2 and 3 or from pre-coded antenna ports 2 and 3.

In an embodiment, a quasi-colocation (QCL) property may be defined and signaled to the UE as part of SS configuration, which may, for example, enhance large scale channel parameter estimation. For example, a network controlled periodically or semi-periodically transmitted RS, such as, for example, a CSI-RS or MRS may be transmitted from antenna ports 0, 1, 2 and 3. In an embodiment, the CSI-RS or MRS may be configured to be QCL RS for a group of REG clusters, such as, for example, REG cluster 502A and REG cluster 502B.

Figure 6:
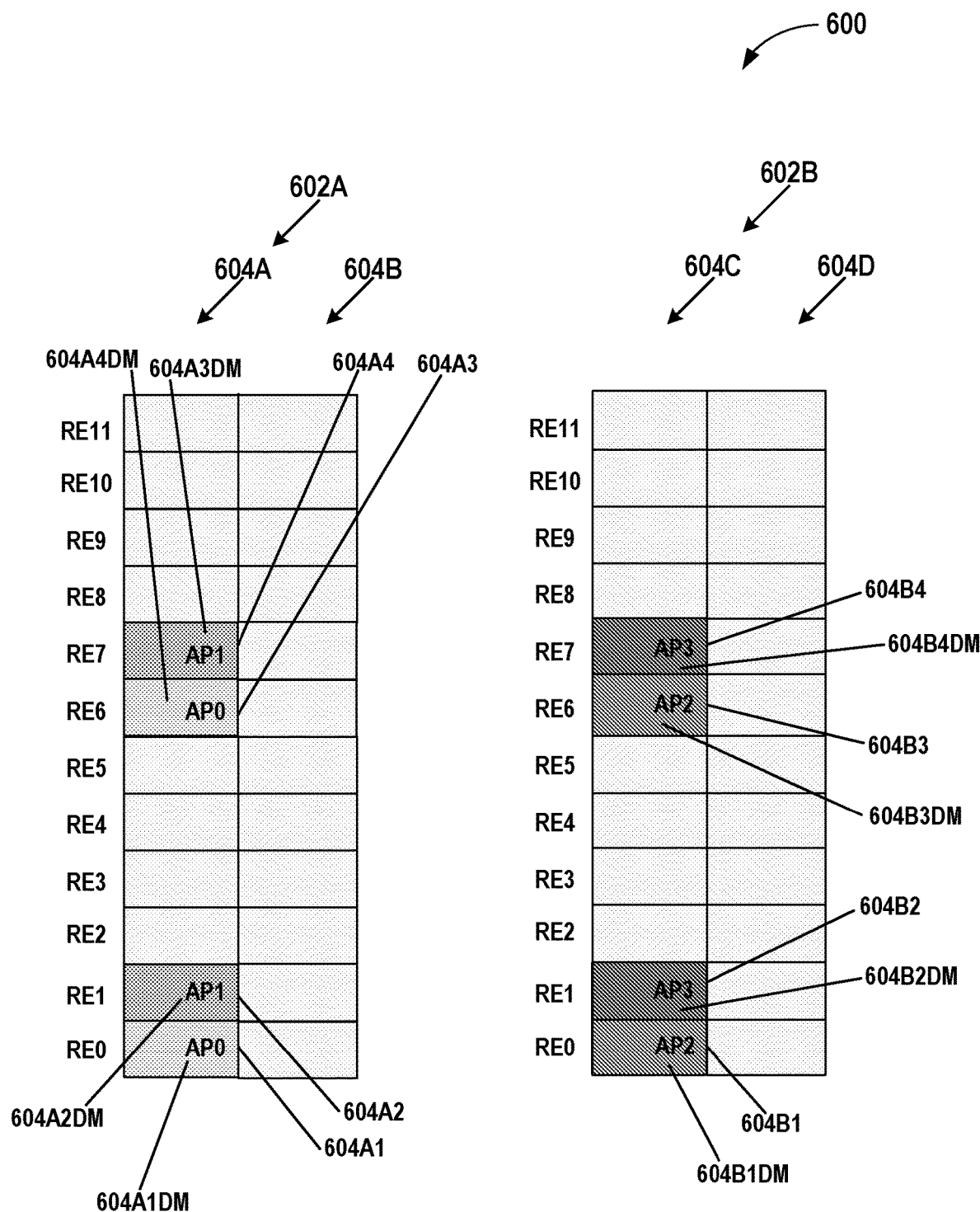
FIG. 6 illustrates an example per-RB DMRS placement for per-RB transmit antenna pair cycling/pre-coded antenna pair cycling according to some embodiments.

FIG. 6 illustrates an example per-RB DMRS placement for per-RB transmit antenna pair cycling/pre-coded antenna pair cycling according to some embodiments. In FIG. 6, NR-PDCCH 600 may include, for example, four REGs, allocated in two RBs, such as, for example, such as, for example, REG 604A and REG 6042B, allocated in RB 602A, and REG 604C1 and REG 604D allocated in RB 602B. Thus, for example, two REGs of an NR-PDCCH may be allocated in each RB. In an embodiment, one REG of NR-PDCCH 600 in an allocated RB may include DMRSs, such as, for example, DMRS 604A1DM, DMRS 604A2DM, DMRS 604A3DM, DMRS 604A4DM allocated to REG 604A of RB 602A, DMRS 604B1DM, DMRS 604B2DM, DMRS 604B3DM, and DMRS 604B4DM allocated to REG 604C of RB 602B. In an embodiment, REGs that include DMRSs in a first RB may be transmitted from a first of two antenna port pairs, such as, for example, the antenna port pair (AP0, AP1), and REGs in a second RB may be transmitted from a second of the two antenna port pairs, such as, for example, the antenna port pair (AP2, AP3). In another embodiment, REGs that include DMRSs in a first RB may be transmitted from a first of two pre-coded antenna port pairs, such as, for example, the pre-coded antenna port pair (AP0, AP1), and REGs in a second RB may be transmitted from a second of the two pre-coded antenna port pairs, such as, for example the pre-coded antenna port pair (AP2, AP3).

From the per-REG DMRS placement in FIG. 6, in an embodiment, different groups of REG RBs may be transmitted from different antenna pairs. In another embodiment, different groups of REG RBs may be transmitted from different pre-coded antenna pairs. For example, REG RBs in an NR-PDCCH may be numbered sequentially, and REG RBs with an even index number may be transmitted from antenna ports 0 and 1 or pre-coded antenna ports 0 and 1, while REGs with an odd index number may be transmitted from antenna ports 2 and 3 or from pre-coded antenna ports 2 and 3.

In an embodiment, a quasi-colocation (QCL) property may be defined and signaled to the UE as part of SS configuration, which may, for example, enhance large scale channel parameter estimation. For example, a network controlled periodically or semi-periodically transmitted RS, such as, for example, a CSI-RS or MRS may be transmitted from antenna ports 0, 1, 2 and 3. In an embodiment, the CSI-RS or MRS may be configured to be QCL RS for a group of REG RBs, such as, for example, REG RB 602A and REG RB 602B.

Thus, embodiments herein may relate to several transmit diversity techniques that may have, for example, low complexity, and may achieve transmit diversity of more than two diversity order. Embodiments herein may provide, for example, the NR-PDCCH that may achieve a fourth order of transmit diversity, though embodiments herein are not limited to a transmit diversity order of four.

Figure 7:
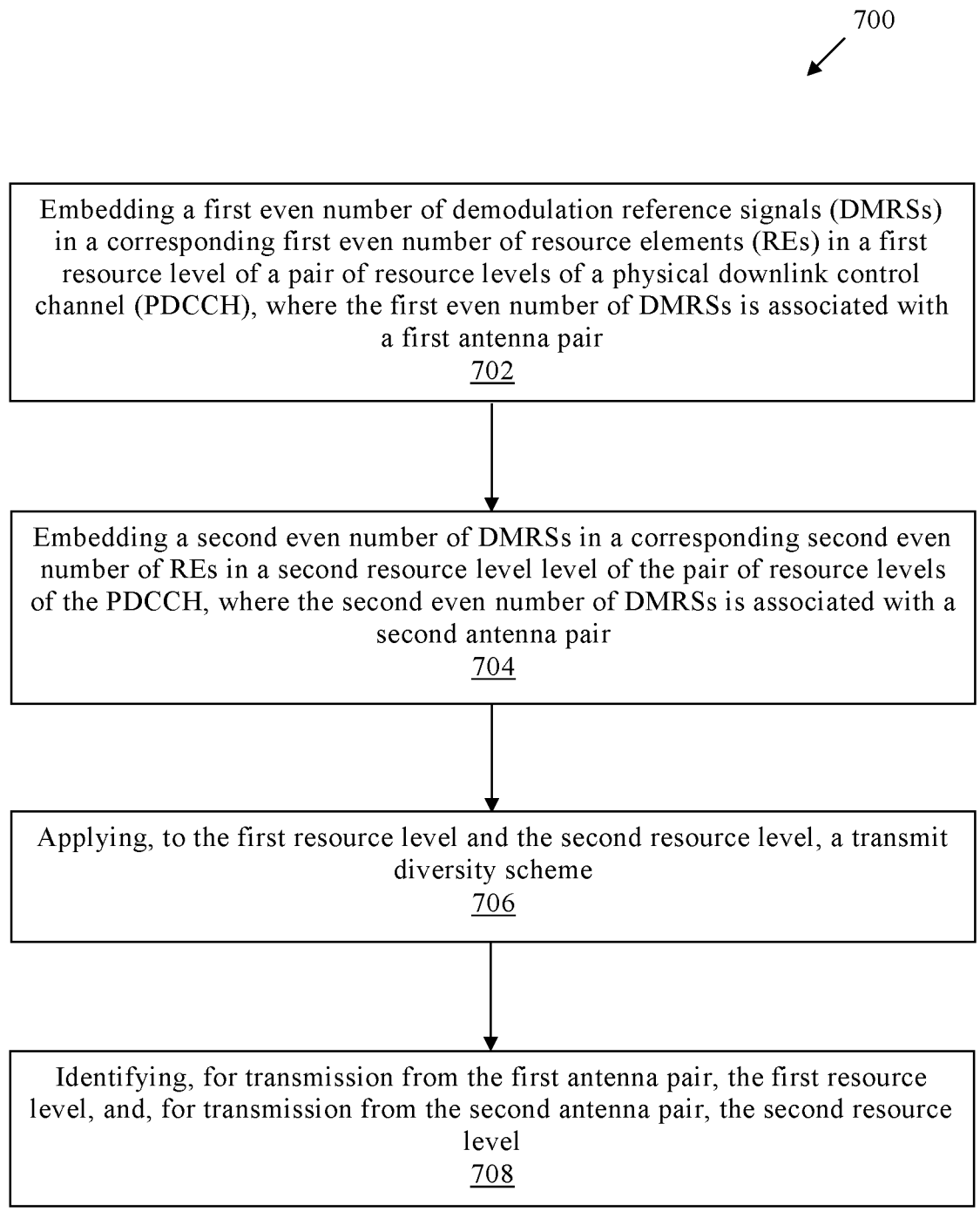
FIG. 7 illustrates an example operation flow/algorithmic structure of a base station according to some embodiments.

FIG. 7 illustrates an example operation flow/algorithmic structure of a base station according to some embodiments. Operation flow/algorithmic structure 700 may include, at 702, embedding a first even number of demodulation reference signals (DMRSs) in a corresponding first even number of resource elements (REs) in a first resource level of a pair of resource levels of a physical downlink control channel (PDCCH), where the first even number of DMRSs is associated with a first antenna pair. In an embodiment, the resource level may be a REG. In another embodiment, the resource level may be a REG cluster. In an embodiment, REs of a first REG of the REG cluster may include DMRSs, and REs of a second REG of the REG cluster may be without DMRSs. In yet another embodiment, the resource level may be an RB. In an embodiment, REs of a first REG of an RB may include DMRSs, and REs of a second REG of the RB may be without DMRSs.

Operation flow/algorithmic structure 700 may further include, at 704, embedding a second even number of DMRSs in a corresponding second even number of REs in a second resource level of the pair of resource levels of the PDCCH, where the second even number of DMRSs is associated with a second antenna pair.

Operation flow/algorithmic structure 700 may further include, at 706, applying, to the first resource level and the second resource level, a transmit diversity scheme. In an embodiment, the transmit diversity scheme may be an SFBC transmit diversity scheme. In another embodiment, the transmit diversity scheme may be a per-RE pre-coder cycling transmit diversity scheme, and the first antenna pair may be a first pre-coded antenna pair, and the second antenna pair may be a second pre-coded antenna pair.

Operation flow/algorithmic structure 700 may further include, at 708, identifying, for transmission from the first antenna pair, the first resource level, and, for transmission from the second antenna pair, the second resource level. In an embodiment, identifying, for transmission by the first antenna pair, the first resource level, and, for transmission by the second antenna pair, the second resource level, may include numbering sequentially the first resource level and the second resource level, where the first resource level has an even number and the second resource level has an odd number; identifying, for transmission by the first antenna pair, the first resource level, based on the even number; and identifying, for transmission from the second antenna pair, the second resource level, based on the odd number.

In an embodiment, operation flow/algorithmic structure 700 may further include providing, for transmission from the first antenna pair and the second antenna pair, a quasi-colocation reference signal (QCL-RS) for the first resource level and the second resource level, and the QCL-RS may be one of a channel state indicator RS (CSI-RS) or a mobility RS (MRS).

Embodiments herein may further include MU-MIMO PDCCH interference mitigation, which may enhance the reception performance of PDCCH for a MU-MIMO transmission. Interference mitigation may, additionally or alternatively, be referred to as interference detection or interference suppression. Embodiments herein may include both non-orthogonal and orthogonal DMRS based MU-MIMO PDCCH interference suppression.

Non-orthogonal DMRS-based MU-MIMO PDCCH transmission may also be referred to as specification transparent MU-MIMO transmission. In the case of non-orthogonal DMRS-based MU-MIMO PDCCH transmission, two MU-MIMO UEs may use quasi-orthogonal DMRS for the beamformed/pre-coded PDCCH transmission. A UE may estimate the channels of other possibly simultaneously transmitted non-orthogonal DMRSs. The UE may estimate the channels using other possibly simultaneous non-orthogonal scrambling IDs. If the channel power of interference, which may be referred to herein as channel power, at the UE is above a certain threshold, the UE may utilize an interference mitigation scheme, such as, for example, a minimum mean square error (MMSE)-based or a successive interference cancellation (SIC)-based interference mitigation scheme, to suppress the residual interference from a co-scheduled MU-MIMO PDCCH.

Orthogonal DMRS-based MU-MIMO PDCCH transmission may also be referred to as specification non-transparent MU-MIMO transmission. In the case of orthogonal DMRS-based MU-MIMO PDCCH transmission, a UE may estimate channels using other possibly orthogonal APs. The UE may estimate the channels of other possibly simultaneously transmitted orthogonal DMRSs using other possibly orthogonal APs. If estimated channel power is above a certain threshold, the UE may apply an interference mitigation scheme to mitigate the residual MU-MIMO PDCCH interference. In the case of non-orthogonal DMRS-based MU-MIMO PDCCH transmission or orthogonal DMRS based MU-MIMO PDCCH transmission, MU-MIMO interferences for a main UE may not necessarily come from the same UE, because a base station, such as, for example, a gNB, may schedule different resource blocks for different UEs or MU-MIMO UE pairs. As used herein, a main UE may refer to a UE that may perform interference mitigation in accordance with embodiments described herein. In some embodiments, the residual interference from co-scheduled MU-MIMO PDCCHs may be mitigated by the main UE, so that the reception performance of MU-MIMO PDCCH may be improved.

In an embodiment, a UE may use non-orthogonal DMRS based MU-MIMO PDCCH interference detection and mitigation. Based on its configured, which, as used herein, may refer to being configured by a base station, PDCCH DMRS scrambling ID, which may also be referred to as a scrambling ID, a main UE may derive the DMRS sequence for all or substantially all configured control channel resource blocks. For example, the main UE may know the relationship between its scrambling ID and other scrambling IDs, which may enable the main UE to derive the DMRS sequence for all or substantially all of the control channel resource blocks. The UE may derive the DMRS sequence according to, for example, DMRS PDCCH generation described in 3GPP Technical Specification (TS) 38.211, which may be referred to as a standardized PDCCH DMRS generation.

With its own PDCCH DMRS configuration, the main UE may know a set of PDCCH DMRS scrambling IDs used for non-orthogonal DMRS-based MU-MIMO transmission for a particular UE. If the main UE knows non-configured PDCCH DMRS scrambling IDs, the main UE may derive DMRS sequences for other potential co-scheduled MU-MIMO PDCCHs in all or substantially all configured control channel resource blocks. As used herein, "other potential co-scheduled MU-MIMO PDCCHs" or "other possibly co-scheduled MU-MIMO PDCCHs" may be referred to as "other MU-MIMO PDCCHs." The UE may derive the DMRS sequences for other MU-MIMO PDCCHs according to, for example, a standardized PDCCH DMRS generation.

Based on DMRS sequences generated for the main UE and the other UEs, the main UE may estimate the channels for its own PDCCH and for other possibly co-scheduled MU-MIMO PDCCHs. The main UE may further estimate the channel powers of the other MU-MIMO PDCCHs. If the channel powers of some other MU-MIMO PDCCHs are greater than a defined threshold, the main UE may determine that PDCCH interference is present and apply MU-MIMO PDCCH interference suppression techniques.

For example, upon the detection of MU-MIMO PDCCH interference, the main UE may apply MMSE-based equalization to estimate soft symbols of its own PDCCH and of the MU-MIMO PDCCH interference. The MMSE-based equalization may be, for example, similar to an MMSE equalizer used for a MIMO reception scheme. With an MMSE equalizer, MU-MIMO PDCCH interference may be inherently suppressed in the estimated soft symbols of the main UE's own PDCCH. The main UE's own estimated PDCCH soft symbols may be provided to a channel decoding module for decoding of downlink control information (DCI) bits.

The main UE may apply other interference cancellation schemes to mitigate MU-MIMO PDCCH interference. For example, MMSE-based MU-MIMO PDCCH soft symbol estimates may be mapped to a Quadrature Phase Shift Keying (QPSK) symbol, based on, for example, certain detector criteria. With these refined MU-MIMO PDCCH symbol estimates, the main UE's own PDCCH symbols may be further refined by an MMSE equalizer. The main UE's refined PDCCH symbol estimates may be provided to a channel decoding module for DCI bit recovery.

In another embodiment, a UE may use orthogonal DMRS-based MU-MIMO PDCCH interference detection and mitigation. Based on its configured AP with respective orthogonal cover code (OCC), a main UE may derive the DMRS sequence for all or substantially all configured control channel resource blocks. For example, the main UE may know the relationship between its AP with respective OCC and other Aps with respective OCCs, which may enable the main UE to derive the DMRS sequence for all or substantially all of the control channel resource blocks. The UE may derive the DMRS sequence according to, for example, a standardized PDCCH DMRS generation.

With its own AP with respective OCC, the main UE may know a set of PDCCH antenna ports and respective OCCs used for orthogonal DMRS based MU-MIMO PDCCH transmission for a particular UE. If the main UE knows non-configured PDCCH DMRS APs and respective OCCs of other UEs, the main UE may derive the DMRS sequences for other potential co-scheduled MU-MIMO PDCCHs in all or substantially all of the configured control channel resource blocks. The main UE may derive the DMRS sequences for other MU-MIMO PDCCHs, according to, for example, a standardized PDCCH DMRS generation. With the derived DMRS sequences for its own PDCCH and orthogonal DMRS of MU-MIMO PDCCHs, may, as described previously, estimate channels, estimate channel powers, determine whether PDCCH interference is present, and mitigate the interference of MU-MIMO PDCCHs.

If both non-orthogonal and orthogonal DMRS-based MU-MIMO PDCCH may be supported, for example, in the NR standard, then a base station, such as, for example, a gNB may apply either non-orthogonal or orthogonal DMRS based MU-MIMO PDCCH scheduling for a given UE. Consequently, both types of MU-MIMO PDCCH interference may occur for a PDCCH reception at a particular UE. Therefore, a main UE may perform joint non-orthogonal and orthogonal MU-MIMO PDCCH interference detection and mitigation. In an embodiment, the main UE may, as described previously, generate DMRS sequences of potential MU-MIMO PDCCH transmissions, for example, all or substantially all DMRS sequences. Further, the main UE may estimate the channels based on the generated potential MU-MIMO PDCCH DMRSs, and the channel powers may be estimated. With the estimated channels and channel powers, the main UE may detect and mitigate MU-MIMO PDCCH interferences as described previously.

Figure 8:
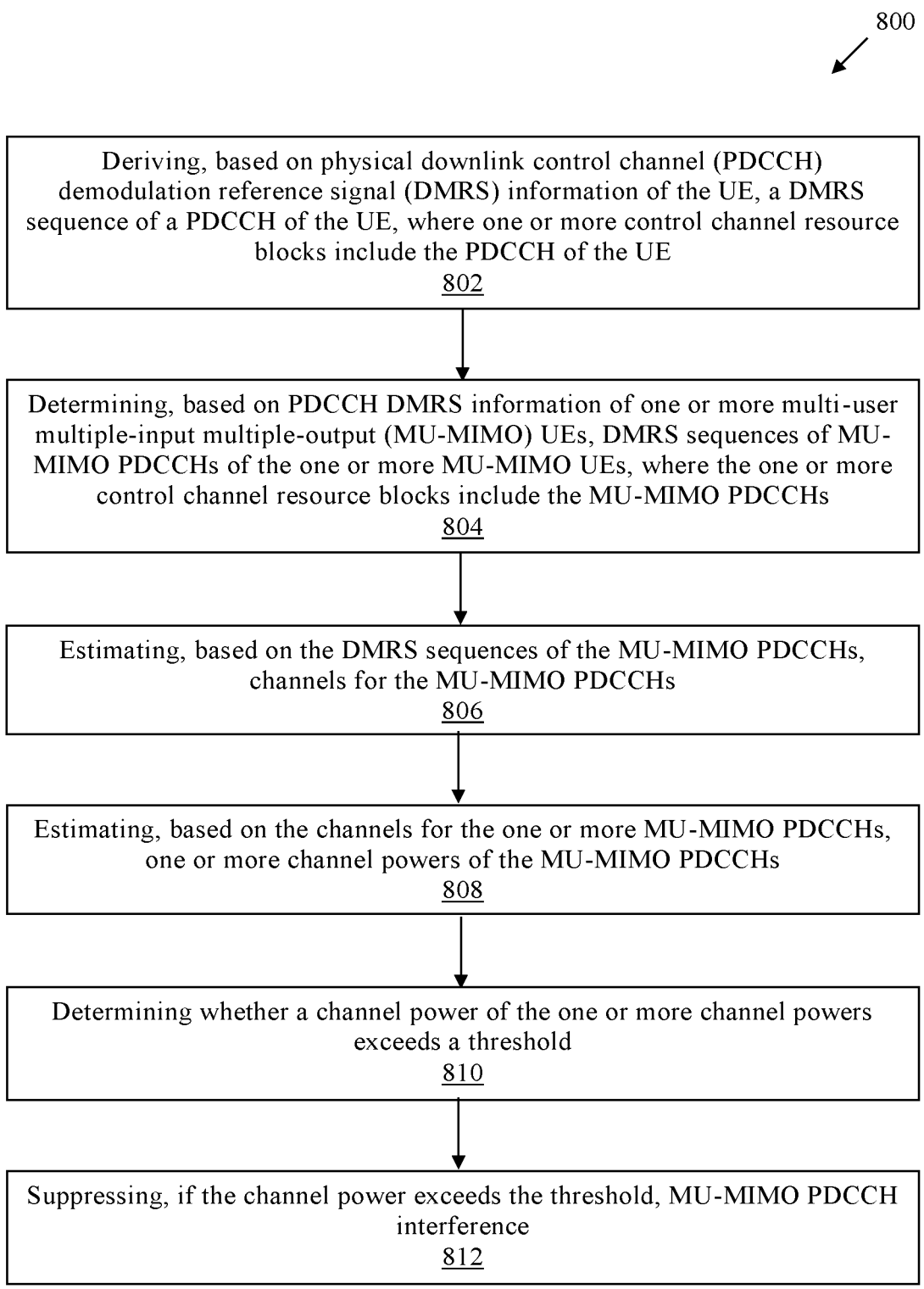
FIG. 8 illustrates an example operation flow/algorithmic structure of a UE according to some embodiments.

FIG. 8 illustrates an example operation flow/algorithmic structure of a UE according to some embodiments. Operation flow/algorithmic structure 800 may include, at 802, deriving, based on physical downlink control channel (PDCCH) demodulation reference signal (DMRS) information of the UE, a DMRS sequence of a PDCCH of the UE, where one or more control channel resource blocks include the PDCCH of the UE. Operation flow/algorithmic structure 800 may further include, at 804, determining, based on PDCCH DMRS information of one or more multi-user multiple-input multiple-output (MU-MIMO) UEs, DMRS sequences of MU-MIMO PDCCHs of the one or more MU-MIMO UEs, where the one or more control channel resource blocks include the MU-MIMO PDCCHs. In an embodiment, PDCCH DMRS information may include a PDCCH DMRS scrambling ID, and the DMRS sequences may be non-orthogonal DMRS sequences. In another embodiment, the PDCCH DMRS information may include an antenna port that includes an orthogonal cover code (OCC), and the DMRS sequences may be orthogonal DMRS sequences.

Operation flow/algorithmic structure 800 may further include, at 806, estimating, based on the DMRS sequences of the MU-MIMO PDCCHs, channels for the MU-MIMO PDCCHs. Operation flow/algorithmic structure 800 may further include, at 808, estimating, based on the channels for the one or more MU-MIMO PDCCHs, one or more channel powers of the MU-MIMO PDCCHs. Operation flow/algorithmic structure 800 may further include, at 810, determining whether a channel power of the one or more channel powers exceeds a threshold. In an embodiment, the presence of MU-MIMO PDCCH interference is indicated when the channel power exceeds the threshold. In an embodiment, a main UE may generate the threshold.

Operation flow/algorithmic structure 800 may further include, at 812, suppressing, if the channel power exceeds the threshold, MU-MIMO PDCCH interference. In an embodiment, suppressing the MU-MIMO PDCCH interference may include estimating a soft symbol of the PDCCH of the UE and estimating a soft symbol of the MU-MIMO PDCCH interference, to generate an estimated MU-MIMO PDCCH symbol. Operation flow/algorithmic structure 800 may further include mapping to a QPSK symbol, based on a detector criteria, the estimated MU-MIMO PDCCH symbol; refining the soft symbol of the PDCCH of the UE, to generate a refined UE PDCCH symbol estimate; and providing, based on the refined UE PDCCH symbol estimate, DCI bit recovery. Operation flow/algorithmic structure 800 may further include estimating, based on the DMRS sequence of the PDCCH of the UE, a channel for the PDCCH of the UE. Operation flow/algorithmic structure 800 may further include decoding the PDCCH of the UE. Decoding the PDCCH may occur if there is MU-MIMO PDCCH interference that gets suppressed, or if there is no MU-MIMO PDCCH interference to be suppressed.

Figure 9:
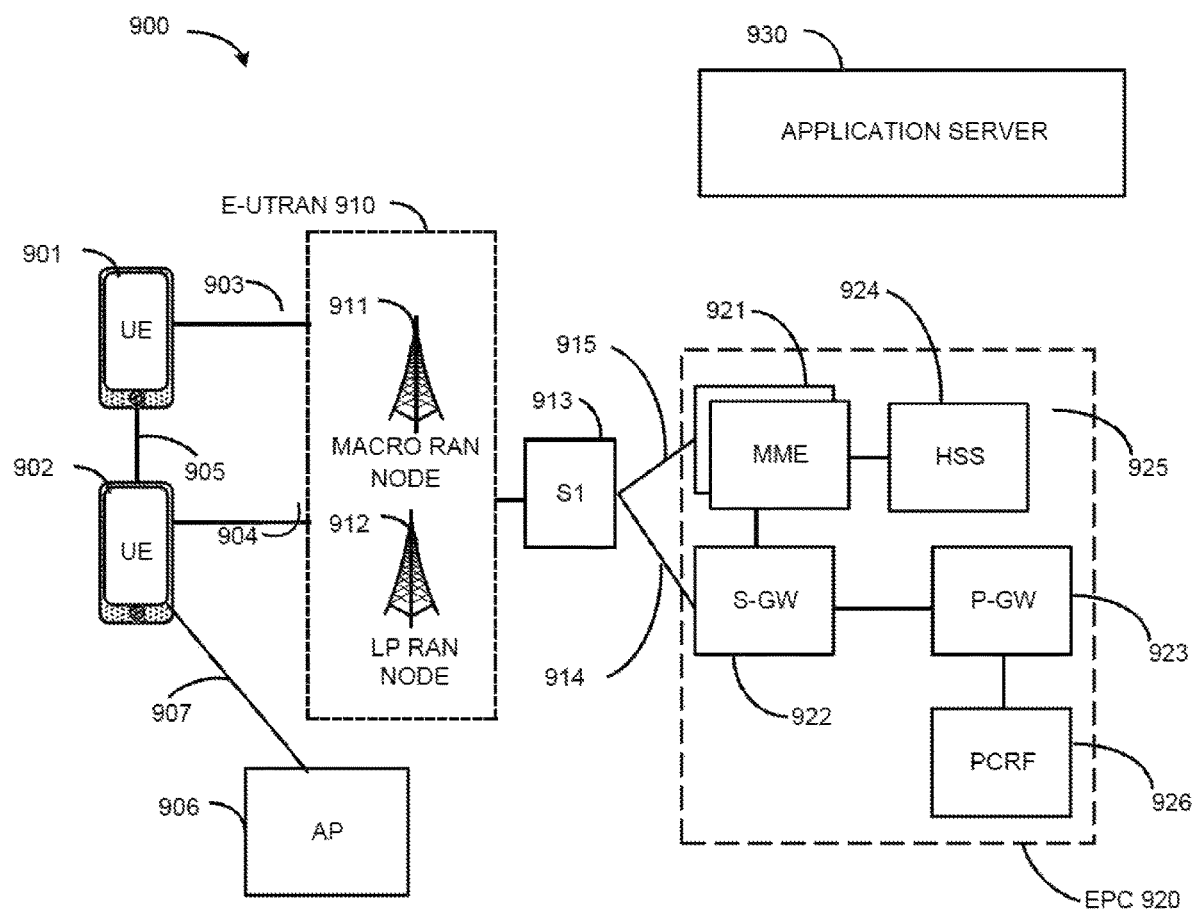
FIG. 9 illustrates an example architecture of a system of a network according to some embodiments.

FIG. 9 illustrates an example architecture of a system 900 of a network according to some embodiments. The system 900 is shown to include a user equipment (UE) 901 and a UE 902. UE 901 or UE 902 may, for example, perform operation flow/algorithmic processes 800. The UEs 901 and 902 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 901 and 902 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 901 and 902 may be configured to connect, e.g., communicatively couple, with a radio access network (RAN)—in this embodiment, an Evolved Universal Mobile Telecommunications System (UMTS) Terrestrial Radio Access Network (E-UTRAN) 910. The UEs 901 and 902 utilize connections 903 and 904, respectively, each of which comprises a physical communications interface or layer (discussed in further detail below); in this example, the connections 903 and 904 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 901 and 902 may further directly exchange communication data via a ProSe interface 905. The ProSe interface 905 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 902 is shown to be configured to access an access point 906 via connection 907. The connection 907 can comprise a local wireless connection, such as a connection consistent with any IEEE 802.11 protocol, wherein the access point 906 would comprise a wireless fidelity (WiFi®) router. In this example, the access point 906 is shown to be connected to the Internet without connecting to the core network of the wireless system (described in further detail below).

The E-UTRAN 910 can include one or more access nodes that enable the connections 903 and 904. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). These ANs may, for example, perform operation flow/algorithmic process 700. The E-UTRAN 910 may include one or more RAN nodes for providing macrocells, e.g., macro RAN node 911, and one or more RAN nodes for providing femtocells or picocells (e.g., cells having smaller coverage areas, smaller user capacity, or higher bandwidth compared to macrocells), e.g., low power (LP) RAN node 912.

Any of the RAN nodes 911 and 912 can terminate the air interface protocol and can be the first point of contact for the UEs 901 and 902. In some embodiments, any of the RAN nodes 911 and 912 can fulfill various logical functions for the E-UTRAN 910 including, but not limited to, radio network controller (RNC) functions such as radio bearer management, uplink and downlink dynamic radio resource management and data packet scheduling, and mobility management.

In accordance with some embodiments, the UEs 901 and 902 can be configured to communicate using Orthogonal Frequency-Division Multiplexing (OFDM) communication signals with each other or with any of the RAN nodes 911 and 912 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 911 and 912 to the UEs 901 and 902, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 901 and 902. The physical downlink control channel (PDCCH) may carry information about the transport format and resource allocations related to the PDSCH channel, among other things. It may also inform the UEs 901 and 902 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 911 and 912 based on channel quality information fed back from any of the UEs 901 and 902. The downlink resource assignment information may be sent on the PDCCH used for (e.g., assigned to) each of the UEs 901 and 902.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The E-UTRAN 910 is shown to be communicatively coupled to a core network—in this embodiment, an Evolved Packet Core (EPC) network 920 via an S1 interface 913. In this embodiment the S1 interface 913 is split into two parts: the S1-U interface 914, which carries traffic data between the RAN nodes 911 and 912 and the serving gateway (S-GW) 922, and the S1-mobility management entity (MME) interface 915, which is a signaling interface between the RAN nodes 911 and 912 and MMEs 921.

In this embodiment, the EPC network 920 comprises the MMEs 921, the S-GW 922, the Packet Data Network (PDN) Gateway (P-GW) 923, and a home subscriber server (HSS) 924. The MMEs 921 may be similar in function to the control plane of legacy Serving General Packet Radio Service (GPRS) Support Nodes (SGSN). The MMEs 921 may manage mobility aspects in access such as gateway selection and tracking area list management. The HSS 924 may comprise a database for network users, including subscription-related information to support the network entities' handling of communication sessions. The EPC network 920 may comprise one or several HSSs 924, depending on the number of mobile subscribers, on the capacity of the equipment, on the organization of the network, etc. For example, the HSS 924 can provide support for routing/roaming, authentication, authorization, naming/addressing resolution, location dependencies, etc.

The S-GW 922 may terminate the S1 interface 913 towards the E-UTRAN 910, and routes data packets between the E-UTRAN 910 and the EPC network 920. In addition, the S-GW 922 may be a local mobility anchor point for inter-RAN node handovers and also may provide an anchor for inter-3GPP mobility. Other responsibilities may include lawful intercept, charging, and some policy enforcement.

The P-GW 923 may terminate an SGi interface toward a PDN. The P-GW 923 may route data packets between the EPC network 923 and external networks such as a network including the application server 930 (alternatively referred to as application function (AF)) via an Internet Protocol (IP) interface 925. Generally, the application server 930 may be an element offering applications that use IP bearer resources with the core network (e.g., UMTS Packet Services (PS) domain, LTE PS data services, etc.). In this embodiment, the P-GW 923 is shown to be communicatively coupled to an application server 930 via an IP communications interface 925. The application server 930 can also be configured to support one or more communication services (e.g., Voice-over-Internet Protocol (VoIP) sessions, PTT sessions, group communication sessions, social networking services, etc.) for the UEs 901 and 902 via the EPC network 920.

The P-GW 923 may further be a node for policy enforcement and charging data collection. Policy and Charging Enforcement Function (PCRF) 926 is the policy and charging control element of the EPC network 920. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 926 may be communicatively coupled to the application server 930 via the P-GW 923. The application server 930 may signal the PCRF 926 to indicate a new service flow and select the appropriate Quality of Service (QoS) and charging parameters. The PCRF 926 may provision this rule into a Policy and Charging Enforcement Function (PCEF) (not shown) with the appropriate traffic flow template (TFT) and QoS class of identifier (QCI), which commences the QoS and charging as specified by the application server 930.

Figure 10:
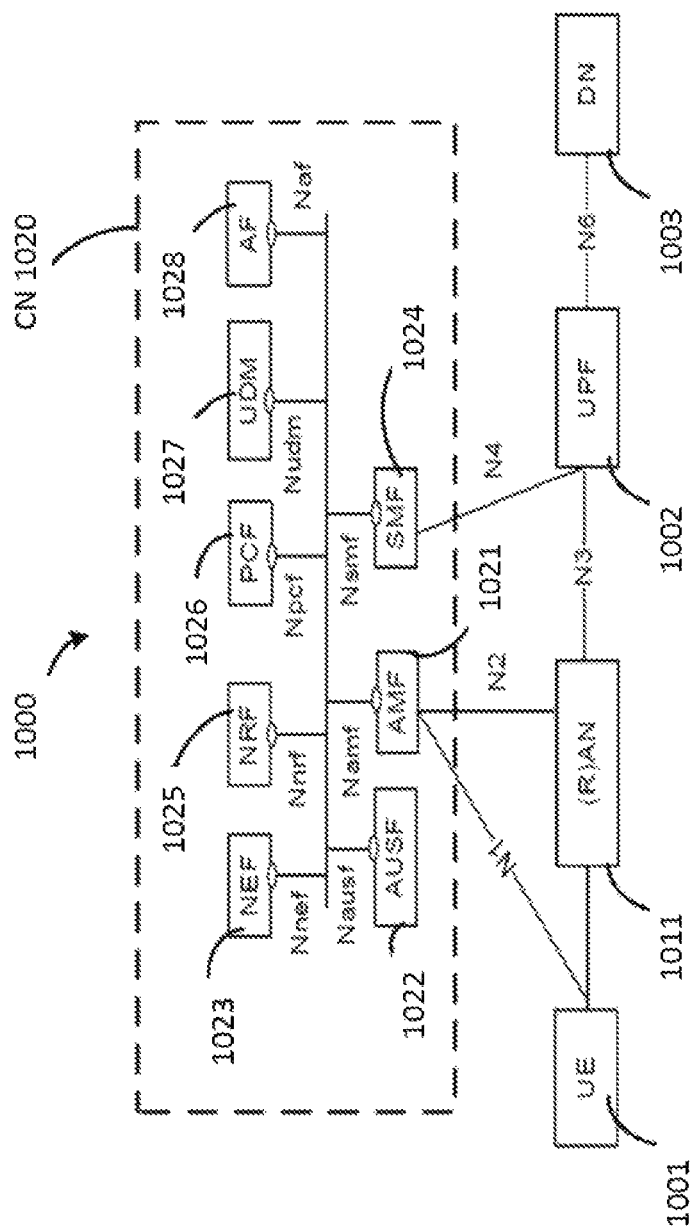
FIG. 10 illustrates an example architecture of another system of a network according to some embodiments.

FIG. 10 illustrates an architecture of a system 1000 of a network in accordance with some embodiments. The system 1000 is shown to include a UE 1001, which may be the same or similar to UEs 901 and 902 discussed previously; a RAN node 1011, which may be the same or similar to RAN nodes 911 and 912 discussed previously; a User Plane Function (UPF) 1002; a Data network (DN) 1003, which may be, for example, operator services, Internet access or 3rd party services; and a 5G Core Network (5GC or CN) 1020.

The CN 1020 may include an Authentication Server Function (AUSF) 1022; a Core Access and Mobility Management Function (AMF) 1021; a Session Management Function (SMF) 1024; a Network Exposure Function (NEF) 1023; a Policy Control function (PCF) 1026; a Network Function (NF) Repository Function (NRF) 1025; a Unified Data Management (UDM) 1027; and an Application Function (AF) 1028. The CN 1020 may also include other elements that are not shown, such as a Structured Data Storage network function (SDSF), an Unstructured Data Storage network function (UDSF), and the like.

The UPF 1002 may act as an anchor point for intra-RAT and inter-RAT mobility, an external PDU session point of interconnect to DN 1003, and a branching point to support multi-homed PDU session. The UPF 1002 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 1002 may include an uplink classifier to support routing traffic flows to a data network. The DN 1003 may represent various network operator services, Internet access, or third party services. NY 1003 may include, or be similar to application server 930 discussed previously.

The AUSF 1022 may store data for authentication of UE 1001 and handle authentication related functionality. Further, the AUSF 1022 may facilitate a common authentication framework for various access types.

The AMF 1021 may be responsible for registration management (e.g., for registering UE 1001, etc.), connection management, reachability management, mobility management, and lawful interception of AMF-related events, and access authentication and authorization. AMF 1021 may provide transport for SM messages between and SMF 1024, and act as a transparent proxy for routing SM messages. AMF 1021 may also provide transport for short message service (SMS) messages between UE 1001 and an SMS function (SMSF) (not shown by FIG. 10). AMF 1021 may act as Security Anchor Function (SEA), which may include interaction with the AUSF 1022 and the UE 1001, receipt of an intermediate key that was established as a result of the UE 1001 authentication process. Where USIM based authentication is used, the AMF 1021 may retrieve the security material from the AUSF 1022. AMF 1021 may also include a Security Context Management (SCM) function, which receives a key from the SEA that it uses to derive access-network specific keys. Furthermore, AMF 1021 may be a termination point of RAN CP interface (N2 reference point), a termination point of NAS (N1) signalling, and perform NAS ciphering and integrity protection.

AMF 1021 may also support NAS signalling with a UE 1001 over an N3 interworking-function (IWF) interface. The N3IWF may be used to provide access to untrusted entities. N33IWF may be a termination point for the N2 and N3 interfaces for control plane and user plane, respectively, and as such, may handle N2 signalling from SMF and AMF for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS (N1) signalling between the UE 1001 and AMF 1021, and relay uplink and downlink user-plane packets between the UE 1001 and UPF 1002. The N3IWF also provides mechanisms for IPsec tunnel establishment with the UE 1001.

The SMF 1024 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 1024 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN.

The NEF 1023 may provide means for securely exposing the services and capabilities provided by 3GPP network functions for third party, internal exposure/re-exposure, Application Functions (e.g., AF 1028), edge computing or fog computing systems, etc. In such embodiments, the NEF 1023 may authenticate, authorize, and/or throttle the AFs. NEF 1023 may also translate information exchanged with the AF 1028 and information exchanged with internal network functions. For example, the NEF 1023 may translate between an AF-Service-Identifier and an internal 5GC information. NEF 1023 may also receive information from other network functions (NFs) based on exposed capabilities of other network functions. This information may be stored at the NEF 1023 as structured data, or at a data storage NF using a standardized interfaces. The stored information can then be re-exposed by the NEF 1023 to other NFs and AFs, and/or used for other purposes such as analytics.

The NRF 1025 may support service discovery functions, receive NF Discovery Requests from NF instances, and provide the information of the discovered NF instances to the NF instances. NRF 1025 also maintains information of available NF instances and their supported services.

The PCF 1026 may provide policy rules to control plane function(s) to enforce them, and may also support unified policy framework to govern network behaviour. The PCF 1026 may also implement a front end (FE) to access subscription information relevant for policy decisions in a UDR of UDM 1027.

The UDM 1027 may handle subscription-related information to support the network entities' handling of communication sessions, and may store subscription data of UE 1001. The UDM 1027 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 1026. UDM 1027 may also support SMS management, wherein an SMS-FE implements the similar application logic as discussed previously.

The AF 1028 may provide application influence on traffic routing, access to the Network Capability Exposure (NCE), and interact with the policy framework for policy control. The NCE may be a mechanism that allows the 5GC and AF 1028 to provide information to each other via NEF 1023, which may be used for edge computing implementations. In such implementations, the network operator and third party services may be hosted close to the UE 1001 access point of attachment to achieve an efficient service delivery through the reduced end-to-end latency and load on the transport network. For edge computing implementations, the 5GC may select a UPF 1002 close to the UE 1001 and execute traffic steering from the UPF 1002 to DN 1003 via the N6 interface. This may be based on the UE subscription data, UE location, and information provided by the AF 1028. In this way, the AF 1028 may influence UPF (re)selection and traffic routing. Based on operator deployment, when AF 1028 is considered to be a trusted entity, the network operator may permit AF 1028 to interact directly with relevant NFs.

As discussed previously, the CN 1020 may include an SMSF, which may be responsible for SMS subscription checking and verification, and relaying SM messages to/from the UE 1001 to/from other entities, such as an SMS-GMSC/IWMSC/SMS-router. The SMS may also interact with AMF 1021 and UDM 1027 for notification procedure that the UE 1001 is available for SMS transfer (e.g., set a UE not reachable flag, and notifying UDM 1027 when UE 1001 is available for SMS).

The system 1000 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf Service-based interface exhibited by AF; Nnrf: Service-based interface exhibited by NRF; and Nausf: Service-based interface exhibited by AUSF.

The system 1000 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an N5 reference point may be between the PCF and the AF; an N7 reference point may be between the PCF and the SMF; an N11 reference point between the AMF and SMF; etc. In some embodiments, the CN 1020 may include an Nx interface, which is an inter-CN interface between the MME (e.g., MME 921) and the AMF 1021 in order to enable interworking between CN 1020 and EPC network 920.

Although not shown by FIG. 10, system 1000 may include multiple RAN nodes 1011 wherein an Xn interface is defined between two or more RAN nodes 1011 (e.g., gNBs and the like) that connecting to 5GC 1020, between a RAN node 1011 (e.g., gNB) connecting to 5GC 1020 and an eNB (e.g., a RAN node 911 of FIG. 9), and/or between two eNBs connecting to 5GC 1020.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1001 in a connected mode (e.g., CM-CONNECTED) including functionality to manage the UE mobility for connected mode between one or more RAN nodes 1011. The mobility support may include context transfer from an old (source) serving RAN node 1011 to new (target) serving RAN node 1011; and control of user plane tunnels between old (source) serving RAN node 1011 to new (target) serving RAN node 1011.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 11:
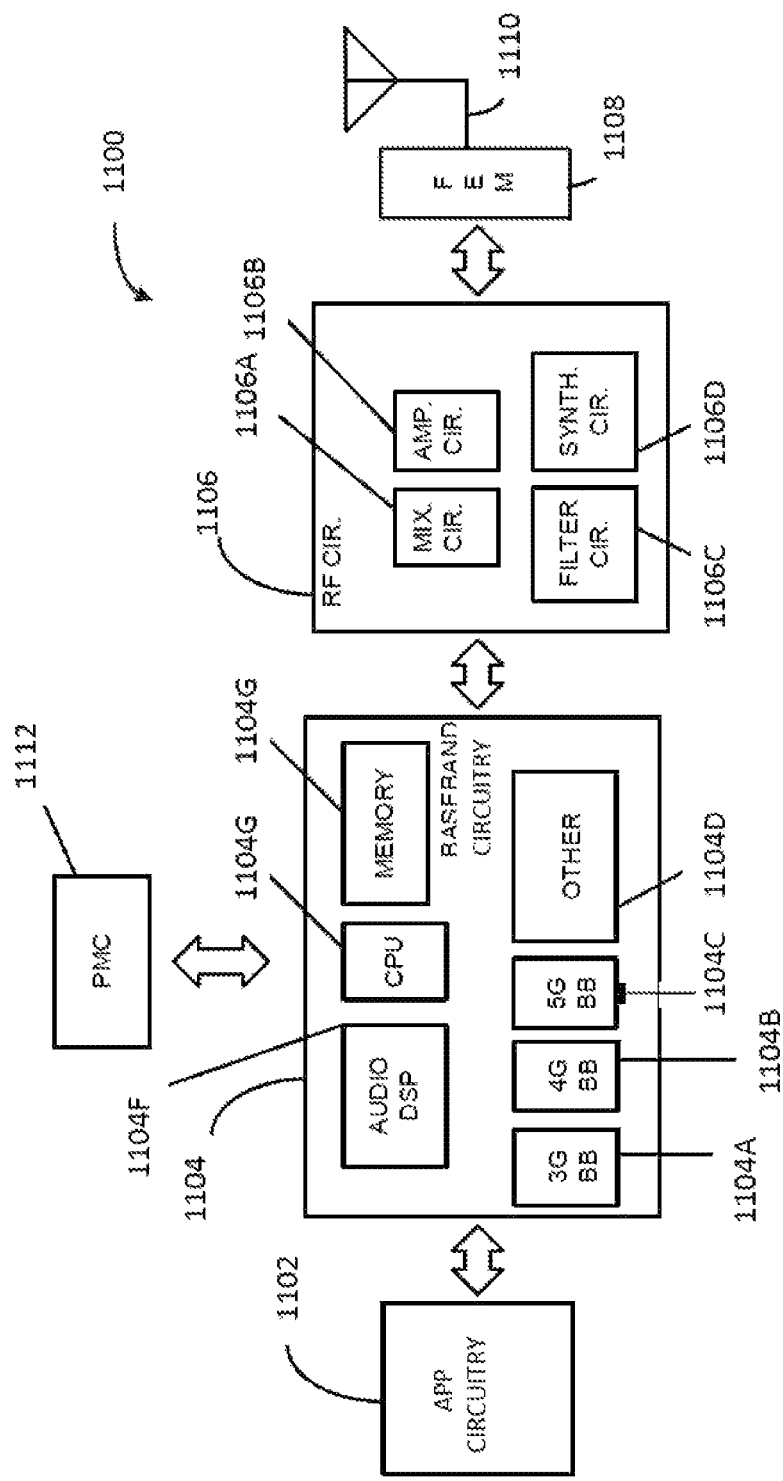
FIG. 11 illustrates example components of a device according to some embodiments.

FIG. 11 illustrates example components of a device 1100 in accordance with some embodiments. In some embodiments, the device 1100 may include application circuitry 1102, baseband circuitry 1104, Radio Frequency (RF) circuitry 1106, front-end module (FEM) circuitry 1108, one or more antennas 1110, and power management circuitry (PMC) 1112 coupled together at least as shown. The components of the illustrated device 1100 may be included in a UE or a RAN node. In some embodiments, the device 1100 may include less elements (e.g., a RAN node may not utilize application circuitry 1102, and instead include a processor/controller to process IP data received from an EPC). In some embodiments, the device 1100 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1100. In some embodiments, processors of application circuitry 1102 may process IP data packets received from an EPC.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1106 and to generate baseband signals for a transmit signal path of the RF circuitry 1106. Baseband processing circuitry 1104 may interface with the application circuitry 1102 for generation and processing of the baseband signals and for controlling operations of the RF circuitry 1106. For example, in some embodiments, the baseband circuitry 1104 may include a third generation (3G) baseband processor 1104A, a fourth generation (4G) baseband processor 1104B, a fifth generation (5G) baseband processor 1104C, or other baseband processor(s) 1104D for other existing generations, generations in development or to be developed in the future (e.g., second generation (2G), si11h generation (6G), etc.). The baseband circuitry 1104 (e.g., one or more of baseband processors 1104A-D) may handle various radio control functions that enable communication with one or more radio networks via the RF circuitry 1106. In other embodiments, some or all of the functionality of baseband processors 1104A-D may be included in modules stored in the memory 1104G and executed via a Central Processing Unit (CPU) 1104E. The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, or constellation mapping/demapping functionality. In some embodiments, encoding/decoding circuitry of the baseband circuitry 1104 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include one or more audio digital signal processor(s) (DSP) 1104F. The audio DSP(s) 1104F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the receive signal path of the RF circuitry 1106 may include mixer circuitry 1106a, amplifier circuitry 1106b and filter circuitry 1106c. In some embodiments, the transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by synthesizer circuitry 1106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, mixer circuitry 1106a of the receive signal path may comprise passive mixers, although the scope of the embodiments is not limited in this respect.

In some embodiments, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1104 and may be filtered by filter circuitry 1106c.

In some embodiments, the mixer circuitry 1106a of the receive signal path and the mixer circuitry 1106a of the transmit signal path may include two or more mixers and may be arranged for quadrature downconversion and upconversion, respectively. In some embodiments, the mixer circuitry 1106a of the receive signal path and the mixer circuitry 1106a of the transmit signal path may include two or more mixers and may be arranged for image rejection (e.g., Hartley image rejection). In some embodiments, the mixer circuitry 1106a of the receive signal path and the mixer circuitry 1106a may be arranged for direct downconversion and direct upconversion, respectively. In some embodiments, the mixer circuitry 1106a of the receive signal path and the mixer circuitry 1106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106d may be a fractional-N synthesizer or a fractional N/N+1 synthesizer, although the scope of the embodiments is not limited in this respect as other types of frequency synthesizers may be suitable. For example, synthesizer circuitry 1106d may be a delta-sigma synthesizer, a frequency multiplier, or a synthesizer comprising a phase-locked loop with a frequency divider.

The synthesizer circuitry 1106d may be configured to synthesize an output frequency for use by the mixer circuitry 1106a of the RF circuitry 1106 based on a frequency input and a divider control input. In some embodiments, the synthesizer circuitry 1106d may be a fractional N/N+1 synthesizer.

In some embodiments, frequency input may be provided by a voltage controlled oscillator (VCO), although that is not a requirement. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106d of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110. In various embodiments, the amplification through the transmit or receive signal paths may be done solely in the RF circuitry 1106, solely in the FEM 1108, or in both the RF circuitry 1106 and the FEM 1108.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110).

In some embodiments, the PMC 1112 may manage power provided to the baseband circuitry 1104. In particular, the PMC 1112 may control power-source selection, voltage scaling, battery charging, or DC-to-DC conversion. The PMC 1112 may often be included when the device 1100 is capable of being powered by a battery, for example, when the device is included in a UE. The PMC 1112 may increase the power conversion efficiency while providing desirable implementation size and heat dissipation characteristics.

While FIG. 11 shows the PMC 1112 coupled only with the baseband circuitry 1104. However, in other embodiments, the PMC 11 12 may be additionally or alternatively coupled with, and perform similar power management operations for, other components such as, but not limited to, application circuitry 1102, RF circuitry 1106, or FEM 1108.

In some embodiments, the PMC 1112 may control, or otherwise be part of, various power saving mechanisms of the device 1100. For example, if the device 1100 is in an RRC_Connected state, where it is still connected to the RAN node as it expects to receive traffic shortly, then it may enter a state known as Discontinuous Reception Mode (DRX) after a period of inactivity. During this state, the device 1100 may power down for brief intervals of time and thus save power.

If there is no data traffic activity for an extended period of time, then the device 1100 may transition off to an RRC_Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1102 and processors of the baseband circuitry 1104 may be used to execute elements of one or more instances of a protocol stack. For example, processors of the baseband circuitry 1104, alone or in combination, may be used execute Layer 3, Layer 2, or Layer 1 functionality, while processors of the application circuitry 1104 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
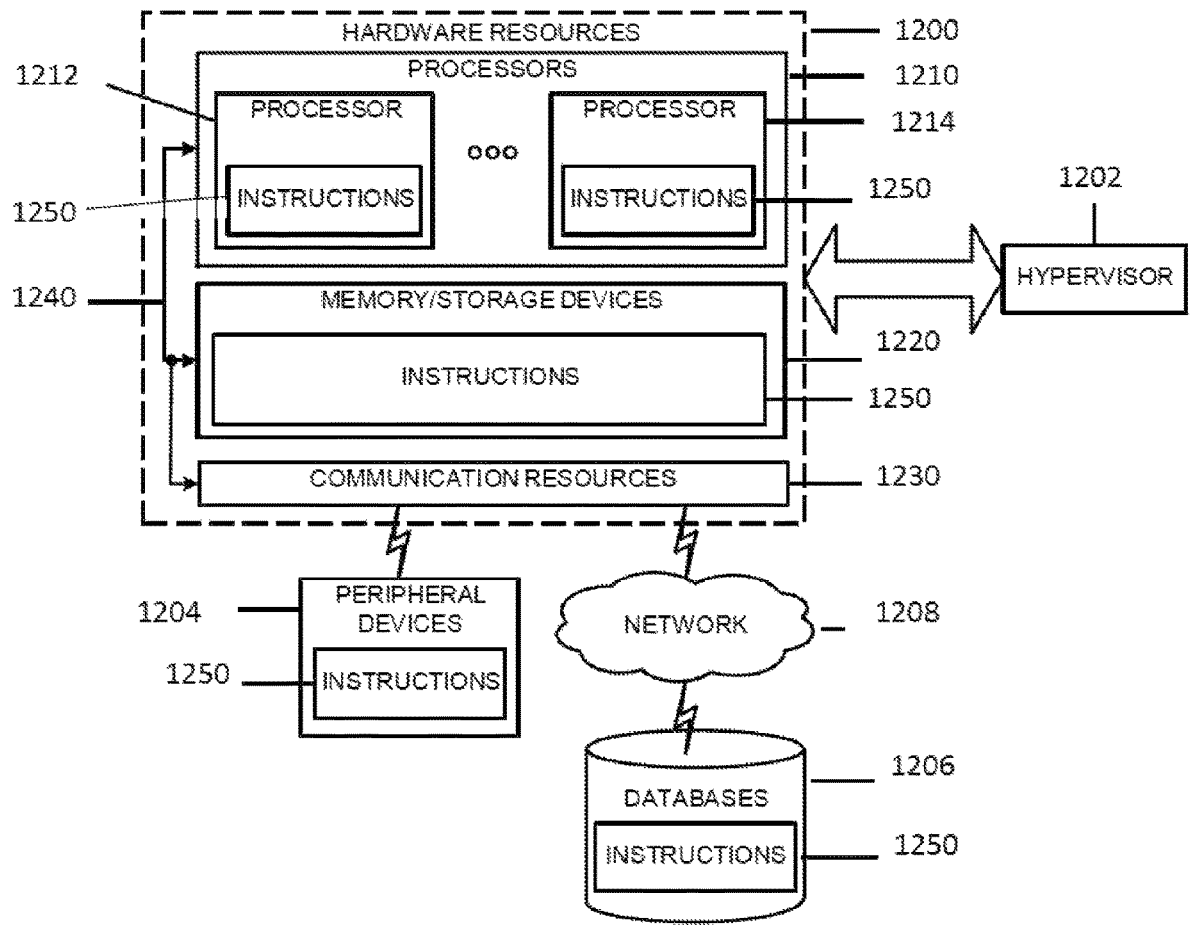
FIG. 12 illustrates an example block diagram illustrating components according to some example embodiments.

FIG. 12 is an example block diagram illustrating components according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc. The memory/storage devices 1220 may store data for operations by one or more processors that may execute the instructions of operation flow/algorithmic structure 700, where such data may include, for example, transmit diversity scheme information, which may include, for example, the identity and associated parameters of a transmit diversity scheme. Further, the memory/storage devices 1220 may store data for operations by one or more processors that may execute the instructions of operation flow/algorithmic structure 800, where such data may include, for example, PDCCH DMRS information.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

Figure 13:
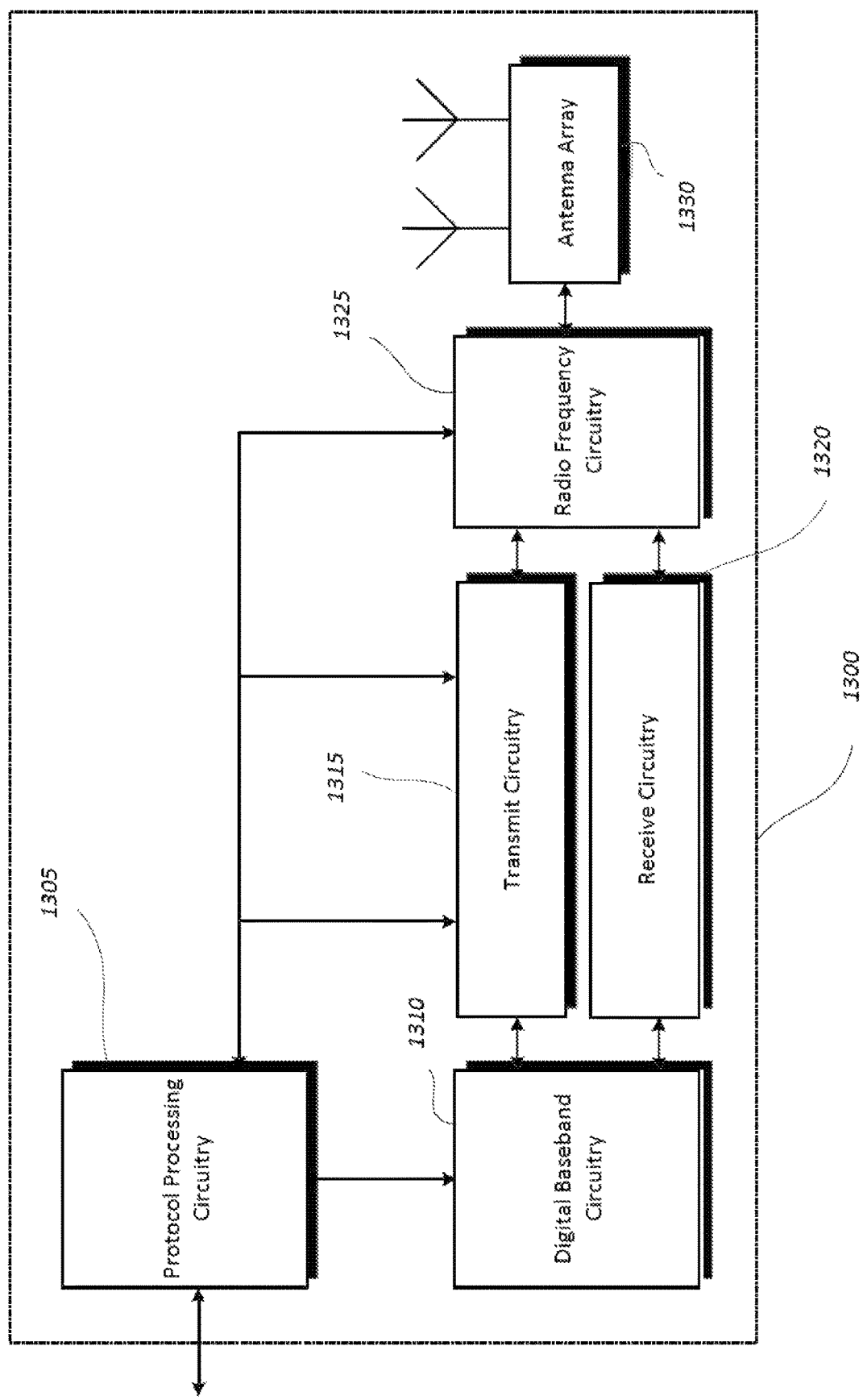
FIG. 13 illustrates an exemplary communication circuitry according to some aspects.

FIG. 13 illustrates an exemplary communication circuitry 1300 according to some aspects. Circuitry 1300 is alternatively grouped according to functions. Components as shown in circuitry 1300 are shown here for illustrative purposes and may include other components not shown in FIG. 13.

Communication circuitry 1300 may include protocol processing circuitry 1305, which may implement one or more of medium access control (MAC), radio link control (RLC), packet data convergence protocol (PDCP), radio resource control (RRC) and non-access stratum (NAS) functions. Protocol processing circuitry 1305 may include one or more processing cores (not shown) to execute instructions and one or more memory structures (not shown) to store program and data information. Protocol processing circuitry 1305 may, for example, perform operation flow/algorithmic process 700 or operation flow/algorithmic process 800.

Communication circuitry 1300 may further include digital baseband circuitry 1310, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Communication circuitry 1300 may further include transmit circuitry 1315, receive circuitry 1320 and/or antenna array circuitry 1330.

Communication circuitry 1300 may further include radio frequency (RF) circuitry 1325. In an aspect of the embodiments herein, RF circuitry 1325 may include multiple parallel RF chains for one or more of transmit or receive functions, each connected to one or more antennas of the antenna array 1330.

In an aspect of the disclosure, protocol processing circuitry 1305 may include one or more instances of control circuitry (not shown) to provide control functions for one or more of digital baseband circuitry 1310, transmit circuitry 1315, receive circuitry 1320, and/or radio frequency circuitry 1325.

Figure 14:
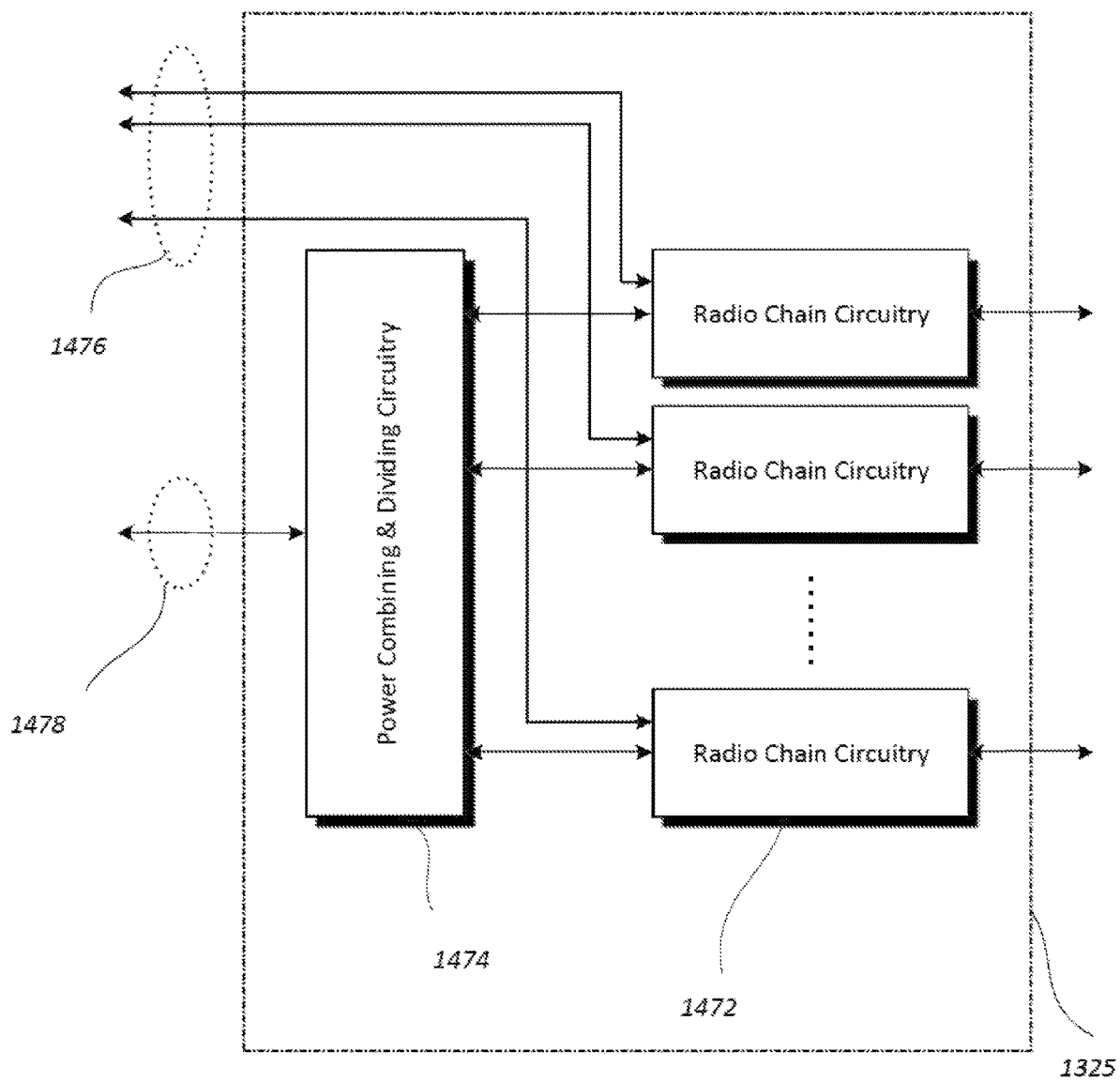
FIG. 14 illustrates an exemplary radio frequency circuitry according to some aspects.

FIG. 14 illustrates an exemplary radio frequency circuitry 1325 in FIG. 13 according to some aspects.

Radio frequency circuitry 1325 may include one or more instances of radio chain circuitry 1472, which in some aspects may include one or more filters, power amplifiers, low noise amplifiers, programmable phase shifters and power supplies (not shown).

Radio frequency circuitry 1325 may include power combining and dividing circuitry 1474 in some aspects. In some aspects, power combining and dividing circuitry 1474 may operate bidirectionally, such that the same physical circuitry may be configured to operate as a power divider when the device is transmitting, and as a power combiner when the device is receiving. In some aspects, power combining and dividing circuitry 1474 may one or more include wholly or partially separate circuitries to perform power dividing when the device is transmitting and power combining when the device is receiving. In some aspects, power combining and dividing circuitry 1474 may include passive circuitry comprising one or more two-way power divider/combiners arranged in a tree. In some aspects, power combining and dividing circuitry 1474 may include active circuitry comprising amplifier circuits.

In some aspects, radio frequency circuitry 1325 may connect to transmit circuitry 1315 and receive circuitry 1320 in FIG. 13 via one or more radio chain interfaces 1476 or a combined radio chain interface 1478.

In some aspects, one or more radio chain interfaces 1476 may provide one or more interfaces to one or more receive or transmit signals, each associated with a single antenna structure which may comprise one or more antennas.

In some aspects, the combined radio chain interface 1478 may provide a single interface to one or more receive or transmit signals, each associated with a group of antenna structures comprising one or more antennas.

In some embodiments, the combined radio chain interface 1478 may be used for millimeter wave communications, while the one or more radio chain interfaces 1476 may be used for lower-frequency communications.

Some non-limiting examples are provided below.

EXAMPLES

Example 1 may include one or more computer-readable media having instructions that, when executed by one or more processors, cause a base station to: embed a first even number of demodulation reference signals (DMRSs) in a corresponding first even number of resource elements (REs) in a first resource level of a pair of resource levels of a physical downlink control channel (PDCCH), wherein the first even number of DMRSs is associated with a first antenna pair; embed a second even number of DMRSs in a corresponding second even number of REs in a second resource level of the pair of resource levels of the PDCCH, wherein the second even number of DMRSs is associated with a second antenna pair; apply, to the first resource level and the second resource level, a transmit diversity scheme; and identify, for transmission from the first antenna pair, the first resource level, and, for transmission from the second antenna pair, the second resource level.

Example 2 may include the one or more computer-readable media of Example 1 or some other example herein, wherein the first or second resource level is a resource element group (REG), a REG cluster, or a resource block.

Example 3 may include the one or more computer-readable media of Example 1 or 2 or some other example herein, wherein the transmit diversity scheme is a space frequency block coding (SFBC) transmit diversity scheme.

Example 4 may include the one or more computer-readable media of Example 1 or 2 or some other example herein, wherein the transmit diversity scheme is per-RE precoder cycling transmit diversity scheme.

Example 5 may include the one or more computer-readable media of Example 4 or some other example herein, wherein the first antenna pair is a first pre-coded antenna pair, and wherein the second antenna pair is a second pre-coded antenna pair.

Example 6 may include the one or more computer-readable media of Example 1 or 2 or some other example herein, wherein, to identify, for transmission by the first antenna pair, the first resource level, and, for transmission by the second antenna pair, the second resource level, the instructions, when executed, further cause the base station to: number sequentially the first resource level and the second resource level, wherein the first resource level has an even number and the second resource level has an odd number; identify, for transmission by the first antenna pair, the first resource level, based on the even number; and identify, for transmission from the second antenna pair, the second resource level, based on the odd number.

Example 7 may include the one or more computer-readable media of Example 1 or 2 or some other example herein, wherein the instructions, when executed, further cause the base station to: provide, for transmission from the first antenna pair and the second antenna pair, a quasi-colocation reference signal (QCL-RS) for the first resource level and the second resource level.

Example 8 may include the one or more computer-readable media of Example 7 or some other example herein, wherein the QCL-RS is one of a channel state indicator RS (CSI-RS) or a mobility RS (MRS).

Example 9 may include an apparatus for a base station, comprising: memory to store transmit diversity scheme information; and processor circuitry, coupled with the memory, to: embed a first even number of demodulation reference signals (DMRSs) in a corresponding first even number of resource elements (REs) in a first resource level of a pair of resource levels of a physical downlink control channel PDCCH, wherein the first even number of DMRSs are associated with a first antenna pair; embed a second even number of DMRSs in a corresponding second even number of REs in a second resource level of the pair of resource levels of the PDCCH, wherein the second even number of DMRSs are associated with a second antenna pair; apply, to the first resource level and the second resource level, a transmit diversity scheme based on the transmit diversity scheme information; and identify, for transmission from the first antenna pair, the first resource level.

Example 10 may include the apparatus of Example 9 or some other example herein, wherein the resource level is a resource element group (REG).

Example 11 may include the apparatus of Example 9 or some other example herein, wherein the resource level is a REG cluster, wherein REs of a first REG of the REG cluster include DMRSs, and wherein REs of a second REG of the REG cluster are without the DMRSs.

Example 12 may include the apparatus of Example 9 or some other example herein, wherein the resource level is a resource block (RB), wherein REs of a first REG of the RB include DMRSs, and wherein REs of a second REG of the RB are without the DMRSs.

Example 13 may include the apparatus of Example 9, 10, 11, or 12 or some other example herein, wherein the transmit diversity scheme is a space frequency block coding (SFBC) transmit diversity scheme.

Example 14 may include the apparatus of Example 9, 10, 11, or 12 or some other example herein, wherein the transmit diversity scheme is per-RE precoder cycling transmit diversity scheme.

Example 15 may include apparatus of Example 14 or some other example herein, wherein the first antenna pair is a first pre-coded antenna pair, and wherein the second antenna pair is a second pre-coded antenna pair.

Example 16 may include the one or more computer-readable media having instructions that, when executed by one or more processors, cause a user equipment (UE) to: derive, based on physical downlink control channel (PDCCH) demodulation reference signal (DMRS) information of the UE, a DMRS sequence of a PDCCH of the UE, wherein one or more control channel resource blocks include the PDCCH of the UE; determine, based on PDCCH DMRS information of one or more multi-user multiple-input multiple-output (MU-MIMO) UEs, DMRS sequences of MU-MIMO PDCCHs of the one or more MU-MIMO UEs, wherein the one or more control channel resource blocks include the MU-MIMO PDCCHs; estimate, based on the DMRS sequences of the MU-MIMO PDCCHs, channels for the MU-MIMO PDCCHs; estimate, based on the channels for the one or more MU-MIMO PDCCHs, one or more channel powers of the MU-MIMO PDCCHs; determine whether a channel power of the one or more channel powers exceeds a threshold; and suppress, if the channel power exceeds the threshold, MU-MIMO PDCCH interference.

Example 17 may include the one or more computer-readable media of Example 16 or some other example herein, wherein the PDCCH DMRS information is a PDCCH DMRS scrambling ID, and wherein the DMRS sequences are non-orthogonal DMRS sequences.

Example 18 may include the one or more computer-readable media of Example 16 or some other example herein, wherein the PDCCH DMRS information is an antenna port that includes an orthogonal cover code (OCC), and wherein the DMRS sequences are orthogonal DMRS sequences.

Example 19 may include the one or more computer-readable media of Example 16, 17, or 18 or some other example herein, wherein, to suppress the MU-MIMO PDCCH interference, the instructions, when executed, further cause the UE to: estimate a soft symbol of the PDCCH of the UE; and estimate a soft symbol of the MU-MIMO PDCCH interference, to generate an estimated MU-MIMO PDCCH symbol.

Example 20 may include the one or more computer-readable media of Example 19 or some other example herein, wherein, the instructions, when executed, further cause the UE to: map to a quadrature phase shift keying (QPSK) symbol, based on a detector criteria, the estimated MU-MIMO PDCCH symbol; refine the soft symbol of the PDCCH of the UE, to generate a refined UE PDCCH symbol estimate; and provide, based on the refined UE PDCCH symbol estimate, downlink control information (DCI) bit recovery.

Example 21 may include the one or more computer-readable media of Example 16, 17, or 18 or some other example herein, wherein the instructions, when executed, further cause the UE to: estimate, based on the DMRS sequence of the PDCCH of the UE, a channel for the PDCCH of the UE; and decode the PDCCH of the UE.

Example 22 may include an apparatus for a user equipment (UE), comprising: memory to store physical downlink control channel (PDCCH) demodulation reference signal (DMRS) information; and processor circuitry, coupled with the memory, to: derive, based on the PDCCH DMRS information, a DMRS sequence of a PDCCH of the UE, wherein one or more control channel resource blocks include the PDCCH; determine, based on PDCCH DMRS information of a multi-user multiple-input (MU-MIMO) UE, a DMRS sequence of MU-MIMO PDCCH of the MU-MIMO UE, wherein the one or more control channel resource blocks include the MU-MIMO PDCCH; estimate, based on the DMRS sequence of the MU-MIMO PDCCH of the MU-MIMO UE, a channel for the MU-MIMO PDCCH; estimate, based on the channel for the MU-MIMO PDCCH, a channel power of the MU-MIMO PDCCH; determine whether the channel power exceeds a threshold; and suppress, if the channel power exceeds the threshold, MU-MIMO PDCCH interference.

Example 23 may include the apparatus of Example 22 or some other example herein, wherein the PDCCH DMRS information is a PDCCH DMRS scrambling ID, and wherein the DMRS sequences are non-orthogonal DMRS sequences.

Example 24 may include the apparatus of Example 22 or some other example herein, wherein the PDCCH DMRS information is an antenna port that includes an orthogonal cover code (OCC), and wherein the DMRS sequences are orthogonal DMRS sequences.

Example 25 may include the apparatus of Example 22, 23, or 24 or some other example herein, wherein the instructions, when executed, further cause the UE to: estimate, based on the DMRS sequence of the PDCCH of the UE, a channel for the PDCCH of the UE; and decode the PDCCH of the UE.

Example 26 may include a method, comprising: embedding a first even number of demodulation reference signals (DMRSs) in a corresponding first even number of resource elements (REs) in a first resource level of a pair of resource levels of a physical downlink control channel (PDCCH), wherein the first even number of DMRSs is associated with a first antenna pair; embedding a second even number of DMRSs in a corresponding second even number of REs in a second resource level of the pair of resource levels of the PDCCH, wherein the second even number of DMRSs is associated with a second antenna pair; applying, to the first resource level and the second resource level, a transmit diversity scheme; and identifying, for transmission from the first antenna pair, the first resource level, and, for transmission from the second antenna pair, the second resource level.

Example 27 may include the method of Example 26 or some other example herein, wherein the first or second resource level is a resource element group (REG), a REG cluster, or a resource block.

Example 28 may include the method of Example 26 or 27 or some other example herein, wherein the transmit diversity scheme is a space frequency block coding (SFBC) transmit diversity scheme.

Example 29 may include the method of Example 26 or 27 or some other example herein, wherein the transmit diversity scheme is per-RE precoder cycling transmit diversity scheme.

Example 30 may include the method of Example 29 or some other example herein, wherein the first antenna pair is a first pre-coded antenna pair, and wherein the second antenna pair is a second pre-coded antenna pair.

Example 31 may include the method of Example 26 or 27 or some other example herein, wherein identifying, for transmission by the first antenna pair, the first resource level, and, for transmission by the second antenna pair, the second resource level, includes: numbering sequentially the first resource level and the second resource level, wherein the first resource level has an even number and the second resource level has an odd number; identifying, for transmission by the first antenna pair, the first resource level, based on the even number; and identifying, for transmission from the second antenna pair, the second resource level, based on the odd number.

Example 32 may include the method of Example 26 or 27 or some other example herein, further comprising: providing, for transmission from the first antenna pair and the second antenna pair, a quasi-colocation reference signal (QCL-RS) for the first resource level and the second resource level.

Example 33 may include the method of Example 32 or some other example herein, wherein the QCL-RS is one of a channel state indicator RS (CSI-RS) or a mobility RS (MRS).

Example 34 may include an apparatus for a base station, comprising: a means for embedding a first even number of demodulation reference signals (DMRSs) in a corresponding first even number of resource elements (REs) in a first resource level of a pair of resource levels of a physical downlink control channel (PDCCH), wherein the first even number of DMRSs is associated with a first antenna pair; a means for embedding a second even number of DMRSs in a corresponding second even number of REs in a second resource level of the pair of resource levels of the PDCCH, wherein the second even number of DMRSs is associated with a second antenna pair; a means for applying, to the first resource level and the second resource level, a transmit diversity scheme; and a means for identifying, for transmission from the first antenna pair, the first resource level, and, for transmission from the second antenna pair, the second resource level.

Example 35 may include the apparatus of Example 34 or some other example herein, wherein the first or second resource level is a resource element group (REG), a REG cluster, or a resource block.

Example 36 may include the apparatus of Example 34 or 35 or some other example herein, wherein the transmit diversity scheme is a space frequency block coding (SFBC) transmit diversity scheme.

Example 37 may include the apparatus of Example 34 or 35 or some other example herein, wherein the transmit diversity scheme is per-RE precoder cycling transmit diversity scheme.

Example 38 may include the apparatus of Example 37 or some other example herein, wherein the first antenna pair is a first pre-coded antenna pair, and wherein the second antenna pair is a second pre-coded antenna pair.

Example 39 may include the apparatus of Example 34 or 35 or some other example herein, wherein the means for identifying, for transmission by the first antenna pair, the first resource level, and, for transmission by the second antenna pair, the second resource level, includes: a means for numbering sequentially the first resource level and the second resource level, wherein the first resource level has an even number and the second resource level has an odd number; a means for identifying, for transmission by the first antenna pair, the first resource level, based on the even number; and a means for identifying, for transmission from the second antenna pair, the second resource level, based on the odd number.

Example 40 may include the apparatus of Example 34 or 35 or some other example herein, further comprising: a means for providing, for transmission from the first antenna pair and the second antenna pair, a quasi-colocation reference signal (QCL-RS) for the first resource level and the second resource level.

Example 41 may include the apparatus of Example 40 or some other example herein, wherein the QCL-RS is one of a channel state indicator RS (CSI-RS) or a mobility RS (MRS).

Example 42 may include a method, comprising: deriving, based on physical downlink control channel (PDCCH) demodulation reference signal (DMRS) information of the UE, a DMRS sequence of a PDCCH of the UE, wherein one or more control channel resource blocks include the PDCCH of the UE; determining, based on PDCCH DMRS information of one or more multi-user multiple-input multiple-output (MU-MIMO) UEs, DMRS sequences of MU-MIMO PDCCHs of the one or more MU-MIMO UEs, wherein the one or more control channel resource blocks include the MU-MIMO PDCCHs; estimating, based on the DMRS sequences of the MU-MIMO PDCCHs, channels for the MU-MIMO PDCCHs; estimating, based on the channels for the one or more MU-MIMO PDCCHs, one or more channel powers of the MU-MIMO PDCCHs; determining whether a channel power of the one or more channel powers exceeds a threshold; and suppressing, if the channel power exceeds the threshold, MU-MIMO PDCCH interference.

Example 43 may include the method of Example 42 or some other example herein, wherein the PDCCH DMRS information is a PDCCH DMRS scrambling ID, and wherein the DMRS sequences are non-orthogonal DMRS sequences.

Example 44 may include the method of Example 42 or some other example herein, wherein PDCCH DMRS information is an antenna port that includes an orthogonal cover code (OCC), and wherein the DMRS sequences are orthogonal DMRS sequences.

Example 45 may include the method of Example 42, 43, or 44 or some other example herein, wherein suppressing the MU-MIMO PDCCH interference, includes: estimating a soft symbol of the PDCCH of the UE; and estimating a soft symbol of the MU-MIMO PDCCH interference, to generate an estimated MU-MIMO PDCCH symbol.

Example 46 may include the method of Example 45 or some other example herein, further comprising: mapping to a quadrature phase shift keying (QPSK) symbol, based on a detector criteria, the estimated MU-MIMO PDCCH symbol; refining the soft symbol of the PDCCH of the UE, to generate a refined UE PDCCH symbol estimate; and providing, based on the refined UE PDCCH symbol estimate, downlink control information (DCI) bit recovery.

Example 47 may include the method of Example 42, 43, or 44 or some other example herein, further comprising: estimating, based on the DMRS sequence of the PDCCH of the UE, a channel for the PDCCH of the UE; and decoding the PDCCH of the UE.

Example 48 may include an apparatus for a user equipment (UE), comprising: a means for deriving, based on physical downlink control channel (PDCCH) demodulation reference signal (DMRS) information of the UE, a DMRS sequence of a PDCCH of the UE, wherein one or more control channel resource blocks include the PDCCH of the UE; a means for determining, based on PDCCH DMRS information of one or more multi-user multiple-input multiple-output (MU-MIMO) UEs, DMRS sequences of MU-MIMO PDCCHs of the one or more MU-MIMO UEs, wherein the one or more control channel resource blocks include the MU-MIMO PDCCHs; a means for estimating, based on the DMRS sequences of the MU-MIMO PDCCHs, channels for the MU-MIMO PDCCHs; a means for estimating, based on the channels for the one or more MU-MIMO PDCCHs, one or more channel powers of the MU-MIMO PDCCHs; a means for determining whether a channel power of the one or more channel powers exceeds a threshold; and a means for suppressing, if the channel power exceeds the threshold, MU-MIMO PDCCH interference.

Example 49 may include the apparatus of Example 48 or some other example herein, wherein the PDCCH DMRS information is a PDCCH DMRS scrambling ID, and wherein the DMRS sequences are non-orthogonal DMRS sequences.

Example 50 may include the apparatus of Example 48 or some other example herein, wherein the PDCCH DMRS information is an antenna port that includes an orthogonal cover code (OCC), and wherein the DMRS sequences are orthogonal DMRS sequences.

Example 51 may include the apparatus of Example 48, 49, or 50 or some other example herein, wherein the means for suppressing the MU-MIMO PDCCH interference includes: a means for estimating a soft symbol of the PDCCH of the UE; and a means for estimating a soft symbol of the MU-MIMO PDCCH interference, to generate an estimated MU-MIMO PDCCH symbol.

Example 52 may include the apparatus of Example 51 or some other example herein, further comprising: a means for mapping to a quadrature phase shift keying (QPSK) symbol, based on a detector criteria, the estimated MU-MIMO PDCCH symbol; a means for refining the soft symbol of the PDCCH of the UE, to generate a refined UE PDCCH symbol estimate; and a means for providing, based on the refined UE PDCCH symbol estimate, downlink control information (DCI) bit recovery.

Example 53 may include the apparatus of Example 48, 49, or 50 or some other example herein, further comprising: a means for estimating, based on the DMRS sequence of the PDCCH of the UE, a channel for the PDCCH of the UE; and a means for decoding the PDCCH of the UE.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. One or more non-transitory, computer-readable media having instructions that, when executed by one or more processors, cause a base station to:
   embed a first even number of demodulation reference signals (DMRSs) in a corresponding first even number of resource elements (REs) in a first resource level of a pair of resource levels of a physical downlink control channel (PDCCH), wherein the first even number of DMRSs are associated with a first antenna pair;
   embed a second even number of DMRSs in a corresponding second even number of REs in a second resource level of the pair of resource levels of the PDCCH, wherein the second even number of DMRSs are associated with a second antenna pair;
   apply, to the first resource level and the second resource level, a transmit diversity scheme; and
   identify, for transmission from the first antenna pair, the first resource level, and, for transmission from the second antenna pair, the second resource level, wherein the instructions, when executed, further cause the base station to:
  number sequentially the first resource level and the second resource level, wherein the first resource level has an even number and the second resource level has an odd number;
  identify, for transmission by the first antenna pair, the first resource level, based on the even number; and
  identify, for transmission from the second antenna pair, the second resource level, based on the odd number.

2. The one or more non-transitory, computer-readable media of claim 1, wherein the first or second resource level is a resource element group (REG), a REG cluster, or a resource block.

3. The one or more non-transitory, computer-readable media of claim 1, wherein the transmit diversity scheme is a space frequency block coding (SFBC) transmit diversity scheme.

4. The one or more non-transitory, computer-readable media of claim 1, wherein the transmit diversity scheme is per-RE precoder cycling transmit diversity scheme.

5. The one or more non-transitory, computer-readable media of claim 4, wherein the first antenna pair is a first pre-coded antenna pair, and wherein the second antenna pair is a second pre-coded antenna pair.

6. The one or more non-transitory, computer-readable media of claim 1, wherein the instructions, when executed, further cause the base station to:
  provide, for transmission from the first antenna pair and the second antenna pair, a quasi-colocation reference signal (QCL-RS) for the first resource level and the second resource level.

7. The one or more non-transitory, computer-readable media of claim 6, wherein the QCL-RS is one of a channel state indicator RS (CSI-RS) or a mobility RS (MRS).

8. A base station, comprising:
  memory to store transmit diversity scheme information; and
  processor circuitry, coupled with the memory, to:
    embed a first even number of demodulation reference signals (DMRSs) in a corresponding first even number of resource elements (REs) in a first resource level of a pair of resource levels of a physical downlink control channel PDCCH, wherein the first even number of DMRSs are associated with a first antenna pair;
    embed a second even number of DMRSs in a corresponding second even number of REs in a second resource level of the pair of resource levels of the PDCCH, wherein the second even number of DMRSs are associated with a second antenna pair;
    apply, to the first resource level and the second resource level, a transmit diversity scheme based on the transmit diversity scheme information; and
    identify, for transmission from the first antenna pair, the first resource level and, for transmission from the second antenna pair, the second resource level, wherein the processor circuitry is further configured to:
      number sequentially the first resource level and the second resource level, wherein the first resource level has an even number and the second resource level has an odd number;
      identify, for transmission by the first antenna pair, the first resource level, based on the even number; and
      identify, for transmission from the second antenna pair, the second resource level, based on the odd number.

9. The base station of claim 8, wherein the first resource level or the second resource level is a resource element group (REG).

10. The base station of claim 8, wherein the first resource level or the second resource level is a REG cluster, wherein REs of a first REG of the REG cluster include DMRSs, and wherein REs of a second REG of the REG cluster are without the DMRSs.

11. The base station of claim 8, wherein the first resource level or the second resource level is a resource block (RB), wherein REs of a first REG of the RB include DMRSs, and wherein REs of a second REG of the RB are without the DMRSs.

12. The base station of claim 8, wherein the transmit diversity scheme is a space frequency block coding (SFBC) transmit diversity scheme.

13. The base station of claim 8, wherein the transmit diversity scheme is per-RE precoder cycling transmit diversity scheme.

14. The base station of claim 13, wherein the first antenna pair is a first pre-coded antenna pair, and wherein the second antenna pair is a second pre-coded antenna pair.

15. One or more non-transitory, computer-readable media having instructions that, when executed by one or more processors, cause a user equipment (UE) to:
  derive, based on physical downlink control channel (PDCCH) demodulation reference signal (DMRS) information of the UE, a DMRS sequence of a PDCCH of the UE, wherein one or more control channel resource blocks include the PDCCH of the UE;
  determine, based on PDCCH DMRS information of one or more multi-user multiple-input multiple-output (MU-MIMO) UEs, DMRS sequences of MU-MIMO PDCCHs of the one or more MU-MIMO UEs, wherein the one or more control channel resource blocks include the MU-MIMO PDCCHs;
  estimate, based on the DMRS sequences of the MU-MIMO PDCCHs, channels for the MU-MIMO PDCCHs;
  estimate, based on the channels for the one or more MU-MIMO PDCCHs, one or more channel powers of the MU-MIMO PDCCHs;
  determine whether a channel power of the one or more channel powers exceeds a threshold; and
  suppress, if the channel power exceeds the threshold, MU-MIMO PDCCH interference, wherein the instructions, when executed, further cause the UE to:
    estimate a soft symbol of the PDCCH of the UE; and
    estimate a soft symbol of the MU-MIMO PDCCH interference, to generate an estimated MU-MIMO PDCCH symbol.

16. The one more non-transitory, computer-readable media of claim 15, wherein the PDCCH DMRS information is a PDCCH DMRS scrambling ID, and wherein the DMRS sequences are non-orthogonal DMRS sequences.

17. The one more non-transitory, computer-readable media of claim 15, wherein the PDCCH DMRS information is an antenna port that includes an orthogonal cover code (OCC), and wherein the DMRS sequences are orthogonal DMRS sequences.

18. The one more non-transitory, computer-readable media of claim 15, wherein, the instructions, when executed, further cause the UE to:

map to a quadrature phase shift keying (QPSK) symbol, based on a detector criteria, the estimated MU-MIMO PDCCH symbol;
refine the soft symbol of the PDCCH of the UE, to generate a refined UE PDCCH symbol estimate; and
provide, based on the refined UE PDCCH symbol estimate, downlink control information (DCI) bit recovery.

19. The one more non-transitory, computer-readable media of claim 15, wherein the instructions, when executed, further cause the UE to:
estimate, based on the DMRS sequence of the PDCCH of the UE, a channel for the PDCCH of the UE; and
decode the PDCCH of the UE.

20. A user equipment (UE), comprising:
memory to store physical downlink control channel (PDCCH) demodulation reference signal (DMRS) information; and
processor circuitry, coupled with the memory, to:
derive, based on the PDCCH DMRS information, a DMRS sequence of a PDCCH of the UE, wherein one or more control channel resource blocks include the PDCCH;
determine, based on PDCCH DMRS information of a multi-user multiple-input (MU-MIMO) UE, a DMRS sequence of MU-MIMO PDCCH of the MU-MIMO UE, wherein the one or more control channel resource blocks include the MU-MIMO PDCCH;
estimate, based on the DMRS sequence of the MU-MIMO PDCCH of the MU-MIMO UE, a channel for the MU-MIMO PDCCH;
estimate, based on the channel for the MU-MIMO PDCCH, a channel power of the MU-MIMO PDCCH;
determine whether the channel power exceeds a threshold; and
suppress, if the channel power exceeds the threshold, MU-MIMO PDCCH interference, wherein the processor circuitry is further configured to:
estimate a soft symbol of the PDCCH of the UE; and
estimate a soft symbol of the MU-MIMO PDCCH interference, to generate an estimated MU-MIMO PDCCH symbol.

21. The UE of claim 20, wherein the PDCCH DMRS information is a PDCCH DMRS scrambling ID, and wherein the DMRS sequences are non-orthogonal DMRS sequences.

22. The UE of claim 20, wherein the PDCCH DMRS information is an antenna port that includes an orthogonal cover code (OCC), and wherein the DMRS sequences are orthogonal DMRS sequences.

23. The UE of claim 20, wherein the processor circuitry is further configured to:
estimate, based on the DMRS sequence of the PDCCH of the UE, a channel for the PDCCH of the UE; and
decode the PDCCH of the UE.

* * * * *